(12) United States Patent
Boylan et al.

(10) Patent No.: US 7,330,907 B2
(45) Date of Patent: Feb. 12, 2008

(54) METHODS, COMPUTER SYSTEMS, AND COMPUTER READABLE MEDIA FOR CONTROLLING THE STATUS OF NETWORK ADDRESS SPACE

(75) Inventors: Dennis Joseph Boylan, Norcross, GA (US); Kenneth Douglas Burroughs, Memphis, TN (US); Sean Ming Drun, Lilburn, GA (US); John Leland Lee, Roswell, GA (US); Angela Kristine Schneider, Germantown, TN (US)

(73) Assignee: Internet Associates, LLC, Union City, GA (US)

( * ) Notice: Subject to any disclaimer, the term of this patent is extended or adjusted under 35 U.S.C. 154(b) by 847 days.

(21) Appl. No.: 10/677,459

(22) Filed: Oct. 2, 2003

(65) Prior Publication Data

US 2005/0076144 A1  Apr. 7, 2005

(51) Int. Cl.
*G06F 15/16* (2006.01)
(52) U.S. Cl. ............... 709/245; 709/220; 709/224; 709/226; 715/736
(58) Field of Classification Search ........ 709/223–226, 709/245, 203, 220; 715/734–736
See application file for complete search history.

(56) References Cited

U.S. PATENT DOCUMENTS

| | | | |
|---|---|---|---|
| 5,960,169 A | 9/1999 | Styczinski | 395/182.04 |
| 6,088,745 A * | 7/2000 | Bertagna et al. | 710/56 |
| 6,404,444 B1 * | 6/2002 | Johnston et al. | 715/839 |
| 6,463,515 B1 * | 10/2002 | Stedman et al. | 711/170 |
| 6,658,437 B1 * | 12/2003 | Lehman | 711/170 |
| 6,681,239 B1 * | 1/2004 | Munroe et al. | 719/312 |
| 6,754,788 B2 * | 6/2004 | Mathews et al. | 711/153 |
| 6,880,102 B1 * | 4/2005 | Bridge | 714/6 |
| 7,051,056 B2 * | 5/2006 | Rodriguez-Rivera et al. | 707/206 |
| 7,146,569 B2 * | 12/2006 | Wilkes | 715/736 |
| 7,185,079 B1 * | 2/2007 | Bainbridge et al. | 709/223 |
| 2003/0053441 A1 | 3/2003 | Banerjee | 370/352 |
| 2004/0070632 A1 | 4/2004 | Wilkes | 345/850 |
| 2004/0168037 A1 | 8/2004 | Dearth et al. | 711/173 |

* cited by examiner

*Primary Examiner*—Philip Tran
(74) *Attorney, Agent, or Firm*—Hope Baldauff Hartman, LLC

(57) ABSTRACT

Methods, computer systems, and computer readable media provide for automated control of the status of network address space. Blocks of networking address space assigned to a network may be allocated from a free status to a new status based upon a request to allocate a particular size block. Blocks of networking address space assigned to a network that have been allocated to a new status may be deallocated to return to a free status based upon a request to deallocate the chosen block. Blocks of networking address space assigned to a network that have been allocated and otherwise manipulated such as through a lend from another network may be reclaimed for the original network upon a request to reclaim the chosen block.

4 Claims, 37 Drawing Sheets

Acme Router & Rocket, Inc.

| Network | ID | Parent | Address Type | Allocation Type & Order | Aggregate | Lending Limits (Min/Max) | Reuse Interval | Description | Address Blocks | Block Status |
|---|---|---|---|---|---|---|---|---|---|---|
| ☐ (4) Acme | 1 | 0 | IPv4 | Rated Fit Low | Y | /28 - /26 | 0 | Acme Routers & Rockets | 192.168.120.144 /28 | Free |
| | | | | | | | | | 192.168.120.208 /28 | Free |
| | | | | | | | | | 192.168.120.224 /30 | Connection |
| | | | | | | | | | 192.168.120.228 /30 | Free |
| | | | | | | | | | 192.168.120.232 /29 | Free |
| | | | | | | | | | 192.168.120.240 /28 | Delegated |
| ⌐(4) Accounting | 3 | 1 | IPv4 | Utilization Fit Low | Y | None | 0 | Accounting Dept. | 192.168.120.128 /29 | Connection |
| | | | | | | | | | 192.168.120.136 /29 | Free |
| ☐(4) Engineering | 4 | 1 | IPv4 | Utilization Fit Low | Y | None | 0 | Engineering Dept. | 192.168.120.64 /26 | Connection |
| ┆ ☐(4) LAB | 5 | 4 | IPv4 | Utilization Fit Low | N | None | 0 | Lab Area | 10.10.10.0 /24 | Allocated |
| ☐(4) Headquarters | 2 | 1 | IPv4 | Utilization Fit Low | Y | None | 0 | Acme headquaters | 192.168.120.0 /26 | Connection |
| ☐(4) Manufacturing | 9 | 1 | IPv4 | Utilization Fit Low | Y | None | 0 | Manufacturing Dept. | | |
| ┆ (4) Assembly Line | 10 | 9 | IPv4 | Utilization Fit Low | Y | None | 0 | Assembly Line | | |
| ☐(4) Sales | 6 | 1 | IPv4 | Rated Fit Low | Y | /28 -/27 | 0 | Sales Dept. | 192.168.120.160 /29 | Connection |
| | | | | | | | | | 192.168.120.168 /31 | Connection |
| | | | | | | | | | 192.168.120.170 /31 | Free |
| | | | | | | | | | 192.168.120.172 /30 | Connection |
| ⌐(4) Sales East | 7 | 6 | IPv4 | Utilization Fit Low | Y | None | 0 | Eastern Sales office | 192.168.120.176 /29 | Connection |
| | | | | | | | | | 192.168.120.184 /29 | Free |
| ⌐(4) Sales West | 8 | 6 | IPv4 | Utilization Fit Low | Y | None | 0 | Western Sales Region | 192.168.120.192 /29 | Connection |
| | | | | | | | | | 192.168.120.200 /29 | Free |

FIG. 2

Acme Router & Rocket, Inc.

| Network | Address Blocks | Size | Status | Aggregate Blocks | Aggregate with Descendants | Addresses | | | %Utilization |
|---|---|---|---|---|---|---|---|---|---|
| | | | | | | | Used | Total | |
| ☐ (4) Acme | 192.168.120.144 /28 | 16 | Free | 192.168.120.144 /28 | 192.168.120.0 /24 | Local | 20 | 64 | 72.656% |
| | 192.168.120.208 /28 | 16 | Free | 192.168.120.208 /28 | | Agg. | 186 | 256 | |
| | 192.168.120.224 /30 | 4 | Connection | 192.168.120.224 /27 | | | | | |
| | 192.168.120.228 /30 | 4 | Free | | | | | | |
| | 192.168.120.232 /29 | 8 | Free | | | | | | |
| | 192.168.120.240 /28 | 16 | Delegated | | | | | | |
| ├─(4) Accounting | 192.168.120.128 /29 | 8 | Connection | 192.168.120.128 /28 | 192.168.120.128 /28 | | 8 | 16 | 50% |
| | 192.168.120.136 /29 | 8 | Free | | | | | | |
| ├─(4) Engineering | 192.168.120.64 /26 | 64 | Connection | 192.168.120.64 /26 | 192.168.120.64 /26 | | 64 | 64 | 100% |
| │ └─(4) LAB | 10.10.10.0 /24 | 256 | Allocated | 10.10.10.0 /24 | 10.10.10.0 /24 | | 256 | 256 | 100% |
| ├─(4) Headquarters | 192.168.120.0 /26 | 64 | Connection | 192.168.120.0 /26 | 192.168.120.0 /26 | | 64 | 64 | 100% |
| ├─(4) Manufacturing | | | | | | Local | 0 | 0 | |
| │ | | | | | | Agg. | 0 | 0 | |
| │ └─(4) Assembly Line | | | | | | | 0 | 0 | |
| ├─(4) Sales | 192.168.120.160 /29 | 8 | Connection | 192.168.120.160 /28 | 192.168.120.160 /27 | Local | 14 | 16 | 62.5% |
| | 192.168.120.168 /30 | 2 | Connection | | 192.168.120.192 /28 | Agg. | 30 | 48 | |
| | 192.168.120.170 /30 | 2 | Free | | | | | | |
| | 192.168.120.172 /30 | 4 | Connection | | | | | | |
| ├─(4) Sales East | 192.168.120.176 /29 | 8 | Connection | 192.168.120.176 /28 | 192.168.120.176 /28 | | 8 | 16 | 50% |
| | 192.168.120.184 /29 | 8 | Free | | | | | | |
| └─(4) Sales West | 192.168.120.192 /29 | 8 | Connection | 192.168.120.192 /28 | 192.168.120.192 /28 | | 8 | 16 | 50% |
| | 192.168.120.200 /29 | 8 | Free | | | | | | |

IPal Admin – Microsoft Internet Explorer

User: admin
∨ System
　　Rated Fit Factors
　　Network Colors
∨ View
　　Define Database Fields
　　User Interface Restore
∨ Users
　　Change User Password
　　Roles
　　User Accounts
∨ Equipment templates
　　Equipment Templates
∨ Database
　　Backup
　　Restore
　　Copy
Logout

IPal Rated Fit Factors

| Type | | BSF | ALF | ALB | ARF | ARB | AUF | AUB |
|------|------|-----|-----|------|---------|-----|--------------|----------|
| IPv4 | EDIT | 6 | 0.4 | -12.8 | -0.5625 | 18 | -0.169921875 | 5.4375 |
| IPv6 | EDIT | 7 | 1 | -128 | -0.54688 | 70 | -0.9 | 116.1563 |
| ASN | EDIT | 0 | 0 | 0 | 0 | 0 | 0 | 0 |

IPal Factor Wizard

The rating factor determine when one block will be chosen over another favorable but larger block.

/— 3212    Address Type

During a lend operation, some blocks may aggregate with the borrowing child network. These blocks are favored for loaning to the child unless they are much larger than the request. delta_Lend is the difference in bits between a large block that will aggregate with a requesting child and a small block that will not aggregate with any child.

3216 — ○ Yes ⊙ No    Is this value constant throughout the entire address range?
[ 2 ]    What is delta_Lend for the smallest blocks?
[ 0 ]    3214  What is delta_Lend for the largest blocks?

3218 — A network may have some free blocks that aggregate with a child network. During a lend or allocation, these blocks are reserved in favor of blocks that will not aggregate, unless the non-aggregate block is much larger. delta_Reserve is the difference in bits between a large non-aggregate block and a smaller block that would aggregate with a child.

3222 — ○ Yes ⊙ No    Is this value constant throughout the entire address range?
[ 3 ]    What is delta_Reserve for the smallest blocks?
[ 0 ]    3220  What is delta_Reserve for the largest blocks?

3224 — Blocks that will aggregate with a child network can be reserved more strongly if the child network has high utilization of its address space.

⊙ Yes ○ No  3226  Does child utilization affect reservation?
3230 — ○ Yes ⊙ No        Is the effect constant throughout the entire address range?
[ 1 ]    How much larger is delta_reserve at 100% utilization for the smallest blocks?
[ 0 ]    3228  How much larger is delta_reserve at 100% utilization for the largest blocks?

3232

| Factors | Block Mask | No Agg | Agg with borrower | Agg with child, 0% util | Agg with child, 50% util | Agg with child, 100% util |
|---|---|---|---|---|---|---|
| BSF [6]  3234 | 32 | 0.000 | -12.800 | 18.000 | 20.718 | 23.437 |
| ALF [0.4] | 31 | 6.000 | -6.400 | 23.437 | 26.071 | 28.705 |
| ALB [-12.8] | 30 | 12.000 | 0.000 | 28.875 | 31.423 | 33.972 |
| ARF [-0.5625] | 29 | 18.000 | 6.400 | 34.312 | 36.776 | 39.240 |
| ARB [18] | 28 | 24.000 | 12.800 | 39.750 | 42.128 | 44.507 |
| AUF [-0.169921875] | 27 | 30.000 | 19.200 | 45.187 | 47.481 | 49.775 |
| AUB [5.4375] | 26 | 36.000 | 25.600 | 50.625 | 52.833 | 55.042 |
|  | 25 | 42.000 | 32.000 | 56.062 | 58.186 | 60.310 |
|  | 24 | 48.000 | 38.400 | 61.500 | 63.539 | 65.578 |
|  | 23 | 54.000 | 44.800 | 66.937 | 68.891 | 70.845 |
| Show Ratings | 22 | 60.000 | 51.200 | 72.375 | 74.244 | 76.113 |
|  | 21 | 66.000 | 57.600 | 77.812 | 79.596 | 81.380 |
| Clear Ratings | 20 | 72.000 | 64.000 | 83.250 | 84.949 | 86.648 |
| Reset | 19 | 78.000 | 70.400 | 88.687 | 90.301 | 91.916 |
|  | 18 | 84.000 | 76.800 | 94.125 | 95.654 | 97.183 |
| Update  Cancel | 17 | 90.000 | 83.200 | 99.562 | 101.006 | 102.451 |
|  | 16 | 96.000 | 89.600 | 105.000 | 106.359 | 107.718 |

FIG. 32A

METHODS, COMPUTER SYSTEMS, AND COMPUTER READABLE MEDIA FOR CONTROLLING THE STATUS OF NETWORK ADDRESS SPACE

TECHNICAL FIELD

The present invention is related to the administration of network address space. More particularly, the present invention relates to controlling the status of blocks of network address space.

BACKGROUND

Networking addresses serve to identify devices and/or locations on a network and may include various classes of information, including telephone numbers, medium access control values corresponding to layer 2 of the communications protocol stack, Internet Protocol ("IP") addresses corresponding to layer 3 of the communications protocol stack, Autonomous System Numbers ("ASN") corresponding to layer 4 of the communications protocol stack, serial numbers, and others. Furthermore, each of the classes of networking addresses may have variations. For example, IP addresses may be of different varieties such as Internet Protocol version 4 ("IPv4") and Internet Protocol version 6 ("IPv6").

Networking addresses such as these must be maintained by an organization and managed appropriately. Such management must insure that no two devices, and/or locations depending upon the class of network addresses, are assigned the same networking address in a common routing area of a network. Additionally, these addresses must be managed appropriately so that networking addresses are assigned to maximize routing table efficiency. Furthermore, because networking addresses are limited commodities, if the available addresses are not appropriately managed, then addresses may be wasted by being unused while a need exists for those addresses. Thus, address uniqueness and appropriate distribution are important factors in network performance.

Conventionally, networking addresses are managed through the manual use of a text listing or a spreadsheet. The spreadsheet may consist of a column of networking addresses or blocks of addresses, with additional columns containing attributes of each address or block of addresses. The information in the cells of the text listing or spreadsheet is updated when the set of managed addresses or the attributes of the addresses have changed. Accordingly, the network administrator must study the spreadsheet to find out the attribute value(s) for a particular networking address or block of addresses. For example, a particular sheet of a spreadsheet may represent a particular network so that the networking addresses on this particular sheet are those designated for that network. Furthermore, one or more columns within a sheet may represent the status of the address block while another column represents the associated network equipment for allocated addresses.

The conventional method of manually tracking network addresses in a spreadsheet provides the administrator with no management tools other than the raw information within the spreadsheet cells. A text listing or spreadsheet may display at most a few hundred data elements in a concise format, whereas an administrator may be responsible for millions of addresses. Furthermore, views of the data are limited to the original organization of the data, for example, in order of address, which requires manual searches or additional utilities to access the information by another perspective, i.e. addresses of a particular status. For address formats such as IP that use classless interdomain routing ("CIDR") based numbering, addresses may be administered in blocks of very specific sizes and boundaries. These limits are not obvious in the conventional spreadsheet method except perhaps to those administrators with a thorough familiarity with the address format, which makes the administration of the addresses more difficult.

The administration of networking address space may require various actions. For example, a portion of space assigned to one network and initially given a free status may later be needed for allocation to a different status, such as being given a connected status for use with particular network connections of devices. As another example, a portion of space that already has been allocated to a particular status may need to be deallocated to return to the pool of free space for the assigned network so that it can later be re-allocated. Additionally, a portion of space that has been allocated may need to be reclaimed, such as where the portion has been transferred to another network during a lend of address space.

The lack of an automated process for controlling the status of portions of the network addressing space creates many problems for the administrator. For manual tasks of administrating the networking address space, there is room for clerical errors as well as errors in judgment each time a manual activity is done. The administrator may experience difficulties in each of the activities required to administer the networking address space including allocation, deallocation, and reclaim.

For allocation, an example of a problem the administrator may face is difficulty in finding available blocks of particular sizes that may be available for allocation to a needed status for a given network. The manual task of dividing up blocks to allocate as needed often leads to the inefficient distribution of address space due to difficulty in manually judging the size and location of the block to allocate.

Additionally, there are issues associated with deallocating blocks that have been previously allocated to a particular status. The blocks must be manually located within the spreadsheet to change their status as appropriate. Furthermore, coalescing of newly deallocated blocks with adjacent free blocks may be overlooked during the manual process. The failure to coalesce smaller blocks into fewer larger ones leads to unnecessary complexity within the representation of the network space. Furthermore, it may be desirable to delay the availability of deallocated blocks for re-use. Addresses persist in the memory of network equipment after the addresses have been deactivated. Reactivation of the addresses before expiration of the old information may cause routing problems. This delay may be overlooked in the manual process. Additionally, these blocks to be deallocated may be needed for a previously initiated reclaim action such that their deallocation should be suspended, but the manual deallocation may overlook the previously initiated reclaim.

In addition to the issue noted above for deallocation, reclaims present several other difficulties for administrators. For example, reclaims may require that address space be placed into a reserved status until a reclaim action can be completed. Reclaiming large blocks of address space requires preventing re-use of smaller blocks that make up the larger blocks to be reclaimed, and keeping track of those blocks that are reserved so as to later form a large block to be reclaimed is a very difficult task to complete manually.

SUMMARY

Embodiments of the present invention address these issues and others by providing methods, computer systems, and computer readable media that automate the control of the status of networking address space. Accordingly, the administrator may more easily assign one status or another to portions of the networking address space. The administrator may control the status by providing basic information to the automated control to complete a status change within a definitional listing for the networking address space. For example, the administrator may provide a size of a block to allocate for a particular network or provide the block to deallocate or reclaim for a particular network.

Embodiments such as computer-implemented methods, computer systems, and computer readable media change a status of a portion of network address space from free to another status. These embodiments involve receiving a request of a block size to allocate for a current network with a new status. It is detected within a definitional listing for the network address space a block with free status of sufficient size to cover the block size to allocate. For the current network, the new status is assigned to the detected block within the definitional listing. Furthermore, the selection of a block may involve relocation of address space from another network.

Other embodiments change a status of a portion of network address space from a first status to a free status. These embodiments involve receiving a request of a block to deallocate for a current network to the free status. For the current network, the free status is assigned to the requested block within a definitional listing for the network address space.

Still other embodiments change a status of a portion of network address space from a first status to a status of a reclaim. These embodiments involve receiving a reclaim action request for a block of a current network. It is detected whether the entire block to reclaim is in a reclaim pending status. When the entire block to reclaim is in the reclaim pending status, the reclaim action is performed upon the entire block within a definitional listing for the network address space.

DESCRIPTION OF THE DRAWINGS

FIG. 2 shows an illustrative definitional listing for networking address space of an embodiment, including the definition of blocks for networks and associated status and parameters.

FIG. 2A shows an illustrative definitional listing for networking address space including utilization and aggregation values computed when rating blocks.

FIG. 13 shows a screenshot where a user is selecting a network to add the device to.

FIG. 14 shows a screenshot where a user is selecting a connection for the device being added.

FIG. 23 shows a screenshot where a user is viewing the parameters of a network.

FIG. 32 shows a screenshot where a user may adjust rated fit parameters used when rating blocks for a find operation.

FIG. 32A shows a screenshot where a user it utilizing a wizard to set the rated fit parameters.

DETAILED DESCRIPTION

Embodiments of the present invention provide automated control of the status of networking address space to allow administrators to manage the networking address space without manually performing the status control. This automated control of the status of the networking address space may provide for various automated functions such as allocating free space to a new status, deallocating space having a particular status to free, and reclaiming space whose status has been previously manipulated such as to move the space to a new network.

The embodiments of the present invention are implemented in a computer setting. A standalone computer may implement embodiments of the present invention. Alternatively, embodiments of the present invention may be implemented on a networked basis where resources are distributed over the network and are accessed through the network as necessary. A typical operating environment for both the standalone implementation and the network-based implementation are shown in FIG. 1.

Figure 1:
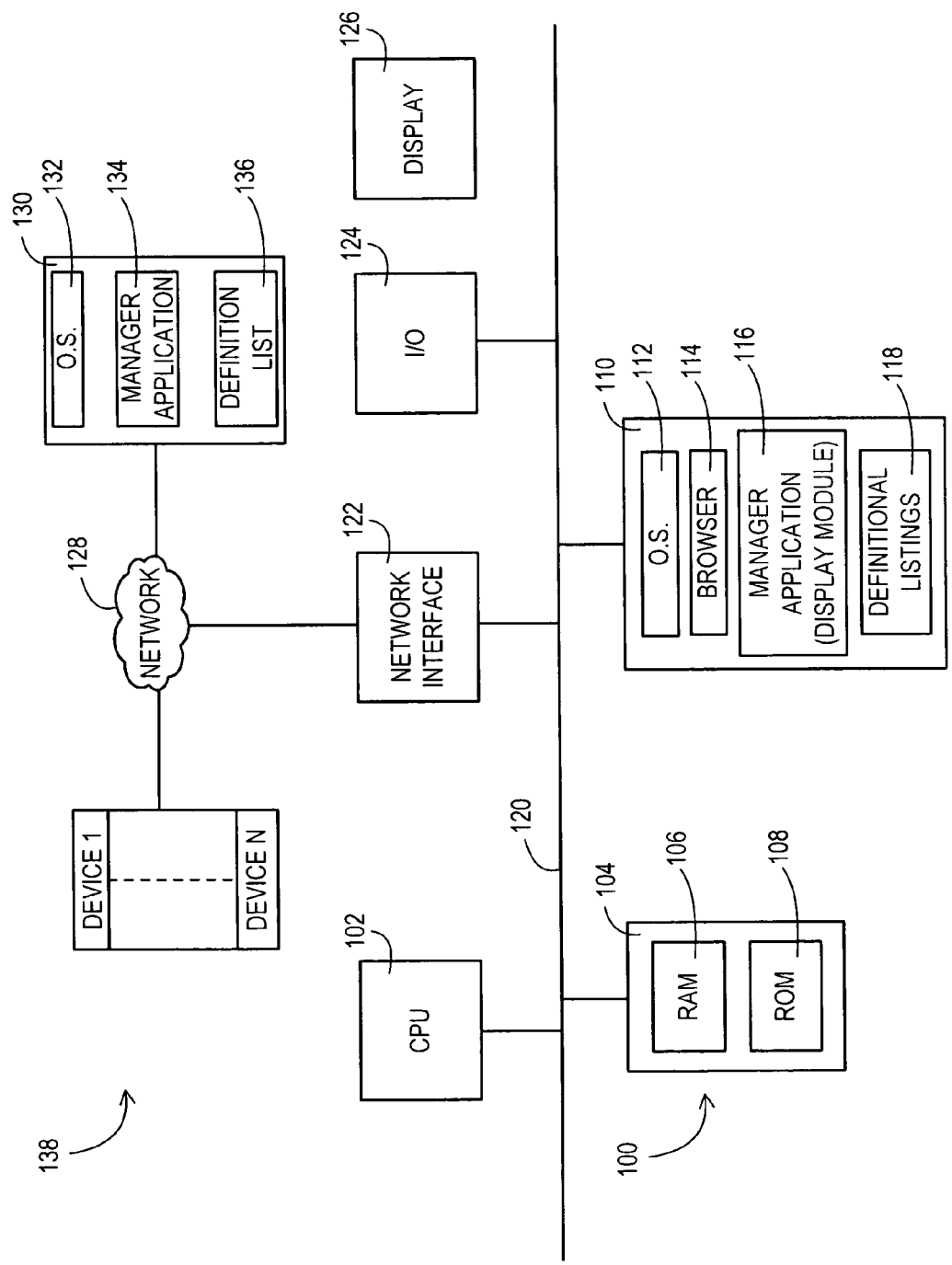
FIG. 1 shows a typical operating environment for embodiments of the present invention including a typical architecture of a computer where displays of network space may be provided.

FIG. 1 and the following discussion are intended to provide a brief, general description of a suitable computer system environment in which the invention may be implemented. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the personal computer of FIG. 1 may also be practiced in distributed computing environments where tasks are performed by remote processing devices that are linked through a communications network. In a distributed computing environment, program modules may be located in both local and remote memory storage devices.

FIG. 1 shows an illustrative computer architecture for a personal computer 100 for practicing the various embodiments of the invention. The computer architecture shown in FIG. 1 illustrates a conventional personal computer, including a central processing unit 102 ("CPU"), a system memory 104, including a random access memory 106 ("RAM") and a read-only memory ("ROM") 108, and a system bus 120 that couples the memory to the CPU 102. A basic input/output system containing the basic routines that help to transfer information between elements within the computer, such as during startup, is stored in the ROM 108.

The personal computer 100 further includes a mass storage device 110 for storing an operating system 112 and application programs. The application programs may include a browser 114 such as a conventional web browser or other dedicated program that may be used to provide displays of networking address space, such as the displays discussed in commonly owned and co-pending U.S. patent application Ser. No. 10/642,475 entitled METHODS, COMPUTER SYSTEMS, AND COMPUTER READABLE MEDIA FOR GENERATING DISPLAYS OF NETWORKING ADDRESSES which is incorporated herein by reference. The application programs may also include a manager application 116 that the browser 114 may operate upon, or that may function independently to render the displays of networking address space and/or to provide the automated control of the status of networking address space. The mass storage device 110 may also store definitional listings of network space usage described below in more detail with reference to FIG. 2 that are utilized by the manager application 116 when performing the control of status of the address space.

The mass storage device 110 is connected to the CPU 102 through a mass storage controller (not shown) connected to the bus 120. The mass storage device 110 and its associated computer-readable media, provide non-volatile storage for the personal computer 100. Although the description of computer-readable media contained herein refers to a mass storage device, such as a hard disk or CD-ROM drive, it should be appreciated by those skilled in the art that computer-readable media can be any available media that can be accessed by the personal computer 100.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The personal computer 100 of FIG. 1 may also include input/output controller interfaces 124 for receiving and processing input from a number of devices, including a keyboard or mouse (not shown). Similarly, the input/output controller interfaces 124 may provide output to a display screen 126, a printer, or other type of output device. Such output may include a display of input fields and graphical user interface controls for receiving user input to initiate a change of status to the networking address space according to logical operations performed by the management application 116 and discussed below with reference to FIGS. 3-11.

As mentioned briefly above, a number of program modules and data files may be stored in the mass storage device 110 and RAM 106 of the personal computer 100, including an operating system 112 suitable for controlling the operation of a stand-alone personal computer. The mass storage device 110 and RAM 106 may also store one or more application programs such as the browser 114 as well as the manager application 116 that provides the control of status for the networking address space. Embodiments of the present invention provide program modules for use in conjunction with the manager program 116. The program modules may implement logical operations such as those of FIGS. 3-11 to control the status of the networking address space. The manager program 116 may utilize additional program modules as well such as to create visual displays of networking address space as discussed above.

As an alternative to providing the manager application 116 and related definitional listings 118 on the mass storage device 110 of the computer 100, these resources may be located on a communications network 128 such as the Internet as mentioned above. The computer 100 may include a network interface 122 linked to the CPU 102 through the bus 120, and the network interface 122 permits data communications to occur between programs being performed by the CPU 102, such as the browser 114, and the resources on the network 128. For example, the network interface 122 may utilize Ethernet protocol to communicate with a communications gateway of the network 128.

The resources necessary to control the status of the networking address space through use of the computer 100 may be located on a computer server 130 also in communication with the network 128. Accordingly, the computer 100 may access the resources of the server 130 over the network such as to access application programs and data maintained by the server 130. The server 130 runs an operating system 132 which allows the server 130 to communicate with the network 128 to provide access to a manager application 134 stored by the server 130. This manager application 134 can be run by the browser 114 of the computer 100. Furthermore, the server 130 may store the definitional listings 136 for the networking address space that may be accessed as necessary by the manager application 134.

While the embodiments above refer to the manager application 116 and/or manager application 134 as being operated upon by a browser 114, it will be appreciated that these application programs may instead be implemented as independently operable computer programs that do not rely upon functionality of a browser. The particular implementation is a design choice. However, utilizing the functionality of a browser allows the manager application program to be operable across a variety of computer platforms without requiring a different manager application program for each platform.

The computer 100 or computer 130 may be an administrative computer that issues the networking address to devices of the network through operation of the manager application. Once issued, routers reference routing tables mapping connections to networking addresses to deliver packets to the device with a particular networking address and receive packets sent by the device to direct them to their destination. Such devices may be present on a global network 128 but are confined to subordinate networks such as local area networks ("LAN") where a portion of the networking address identifies the subordinate network and a remaining portion identifies the device on the subordinate network. These devices 1-N of one or more subordinate networks are shown generally in FIG. 1 as device set 138.

Network address space may be administered from a single set of addresses, however, dividing the set of defined address space aids the network administrator in managing the distribution of addresses with regard to address utilization and route aggregation, supporting multiple address types, as well as controlling administrative access to the addresses. This is accomplished by dividing the address space into multiple sets, each associated with a distinct network which has attributes controlling the management of the contained space. Advanced functions of the allocation process use network configuration and relationships between networks, which are arranged in a linked structure such as a tree. FIG. 2 shows an illustrative table representative of a definitional listing for a set of networks of a corporation using IPv4. The definitional listing may include networks with other types, or a mix of networks of different types.

Associating address space with networks also supports the existence of distinct instances of address space. Transferring address space between networks and calculating aggregate address blocks are functions to be performed on a single instance of network address space. A network is considered to aggregate, or share space, with its parent network if it is configured to aggregate and it supports the same address type (i.e. IPv4) as its parent. A network is also considered to aggregate with an ancestor network if it aggregates with its parent and the parent aggregates with the ancestor. Any two networks are considered to aggregate if they aggregate with a common ancestor. Advanced functions of lending and rated fit block selection, discussed below with reference to FIGS. 4 and 8, respectively, limit their scope to within a set of aggregate networks.

The listing of FIG. 2 includes several categories of information. The categories include: a network name, an ID for the network, an ID of the parent of the network if any, an address type, an allocation type and order, whether the network aggregates, lending limits for the network, a re-use interval for the network, a description of the network, address blocks assigned to the network, and a status of each address block. Each of these categories of information is discussed in greater detail below in relation to the operational flow shown in FIGS. 3-11. For purposes of illustration, the network category of the table of FIG. 2 includes the tree structure and related icons reflected in the screenshots of FIGS. 12-31 and 33-35, discussed below in greater detail, to demonstrate the relationship of each entry of the tree to the set of information that is associated with each entry.

In an IP network, two interfaces are directly connected in the IP layer only if their addresses belong to the same IP network segment as determined by their respective addresses and masks. Insuring network connectivity requires the allocation of individual addresses from the same block for all mutually connected addresses. A connection is an address block that has been allocated to represent a network segment with multiple attached interfaces.

Creation of the first interface on a network segment requires the allocation of a block of address space for the connection. The entire block is designated as belonging to the connection so that it cannot be divided or transferred to another purpose. The allocated block must be of sufficient size to support the number of interfaces that will ultimately be connected to the segment. A single address is assigned from the available addresses within the connection block. This address along with the mask of the entire connection block comprises the interface address. Subsequent allocation of interfaces on an existing segment requires identifying the existing connection block. Another address from within the connection block is assigned to the interface along with the mask of the entire connection block. In each case, the status of the address within the connection block is changed to indicate the individual address is in use.

Connection blocks may not be further divided for transfer to another network. Therefore, selection of addresses within a connection block is not subject to lending as discussed below with reference to FIGS. 3 and 4. In addition, addresses within the block will not aggregate with descendant networks, so the aggregate processing of rated fit selection is unnecessary, as discussed below with reference to FIG. 8.

Devices define sets of associated addresses that comprise a structured view of a physical or logical network. Devices provide links between their attached networks, regardless of the relationship between those networks. They may link networks from distinct instances of IP space, for example public and private networks, and between networks of different address types, including but not limited to IPv4 and IPv6.

Device templates assist the user in creating an appropriate set of interfaces and allocations. A template predefines a set of interfaces and configuration data appropriate for a selected hardware type of a particular application of the type. It may be used to restrict the number and type of interfaces, follow naming conventions, request specific descriptive information, or control the type of addresses that may be applied to specific interfaces.

Figure 3:
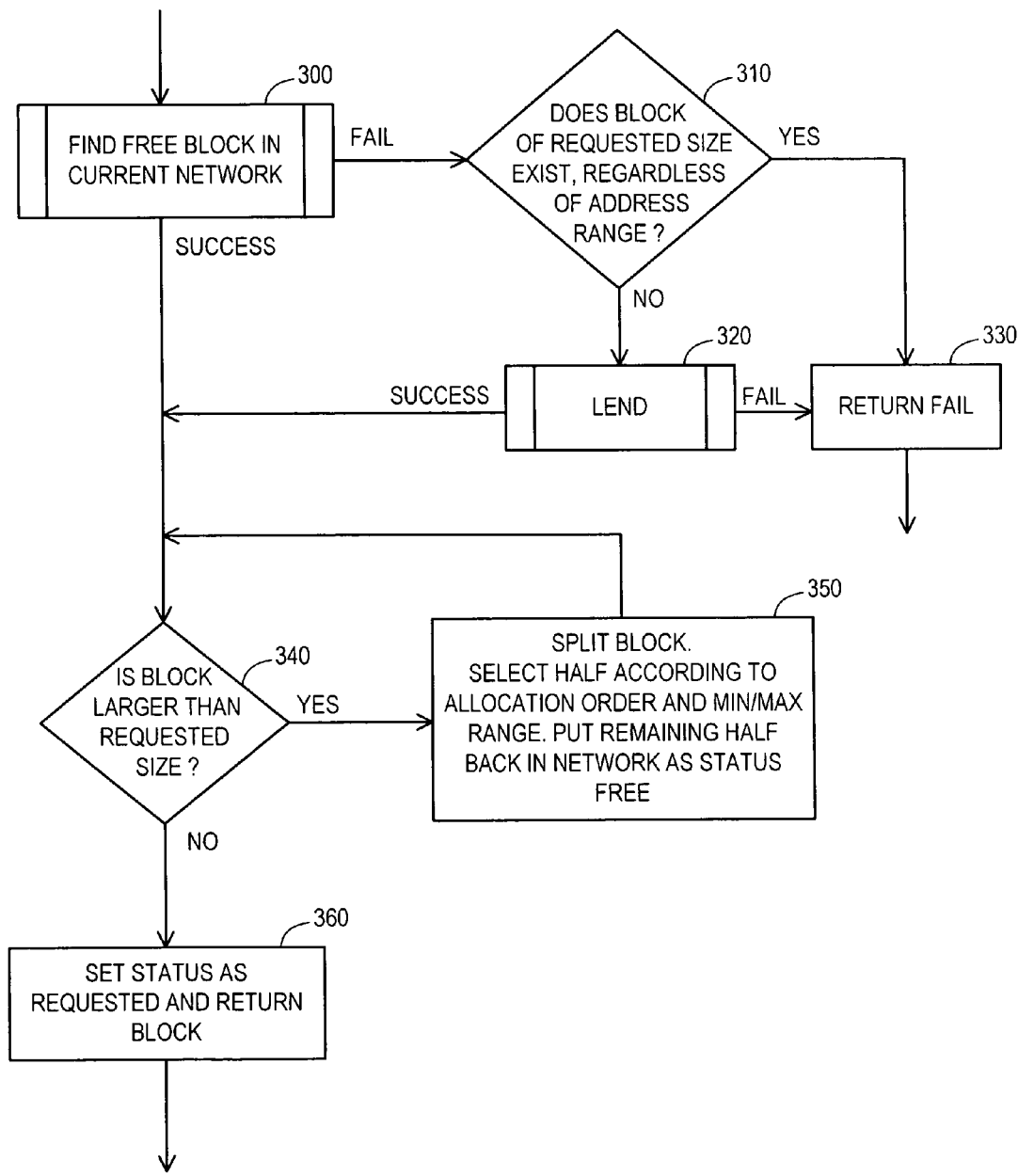
FIG. 3 shows an operational flow of an embodiment for allocating address space by finding a block of the appropriate size and assigning a new status to it.

As discussed above in relation to FIG. 1, the manager application may provide various functions including the controlling the status of the various blocks of network address space being managed. One function is an allocation function whereby a block becomes allocated by its status as a free block being changed to a new allocated status. This allocation function is represented in FIG. 3. The allocation functions begin at free block operation 300 upon the user providing a request to allocate a free block such as for a device connection discussed above. The user provides information to initiate allocation of a free block by adding devices to the network and creating a connection for the device.

Figure 12:
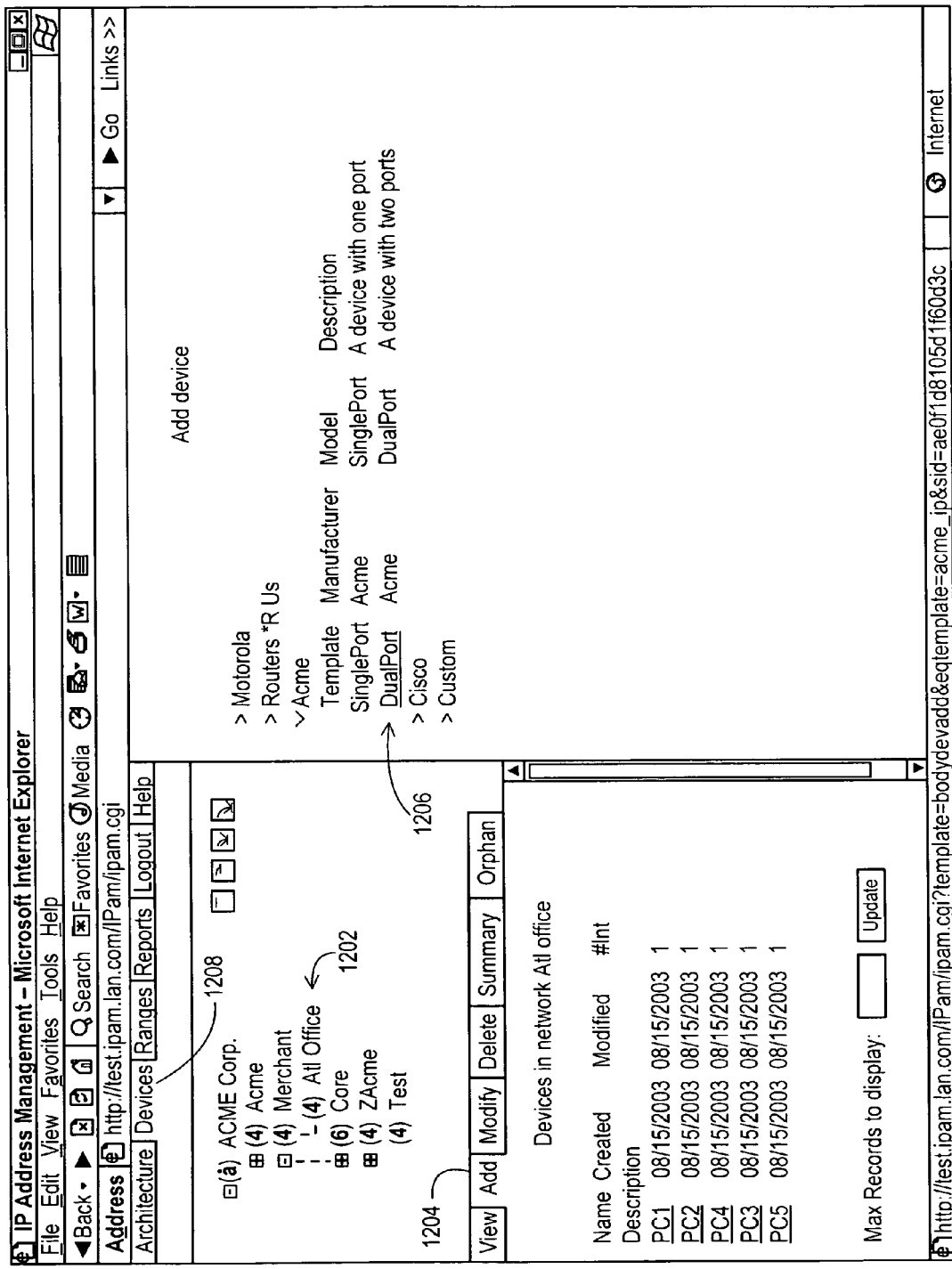
FIG. 12 shows a screenshot where a user is selecting a device to add.

FIG. 12 shows an illustrative screenshot 1200 of a manager application where the user is attempting to add a device which gives rise to the allocation operations of FIG. 3. The current network is "Atl office" 1202 as highlighted in the tree. The user has selected "devices" button 1208 which displays the device options. The user has also then selected the "add" button 1204 which displays the menu of devices that the user may add to the network. In this example, the user selects the Acme single port device, referencing a template with predefined configuration details for that device type. Device templates assist the user with accurate address allocation by specifying an appropriate number of interfaces and the allowed address options for the device, for example support of single-bit addresses which will be discussed further.

Figure 13:
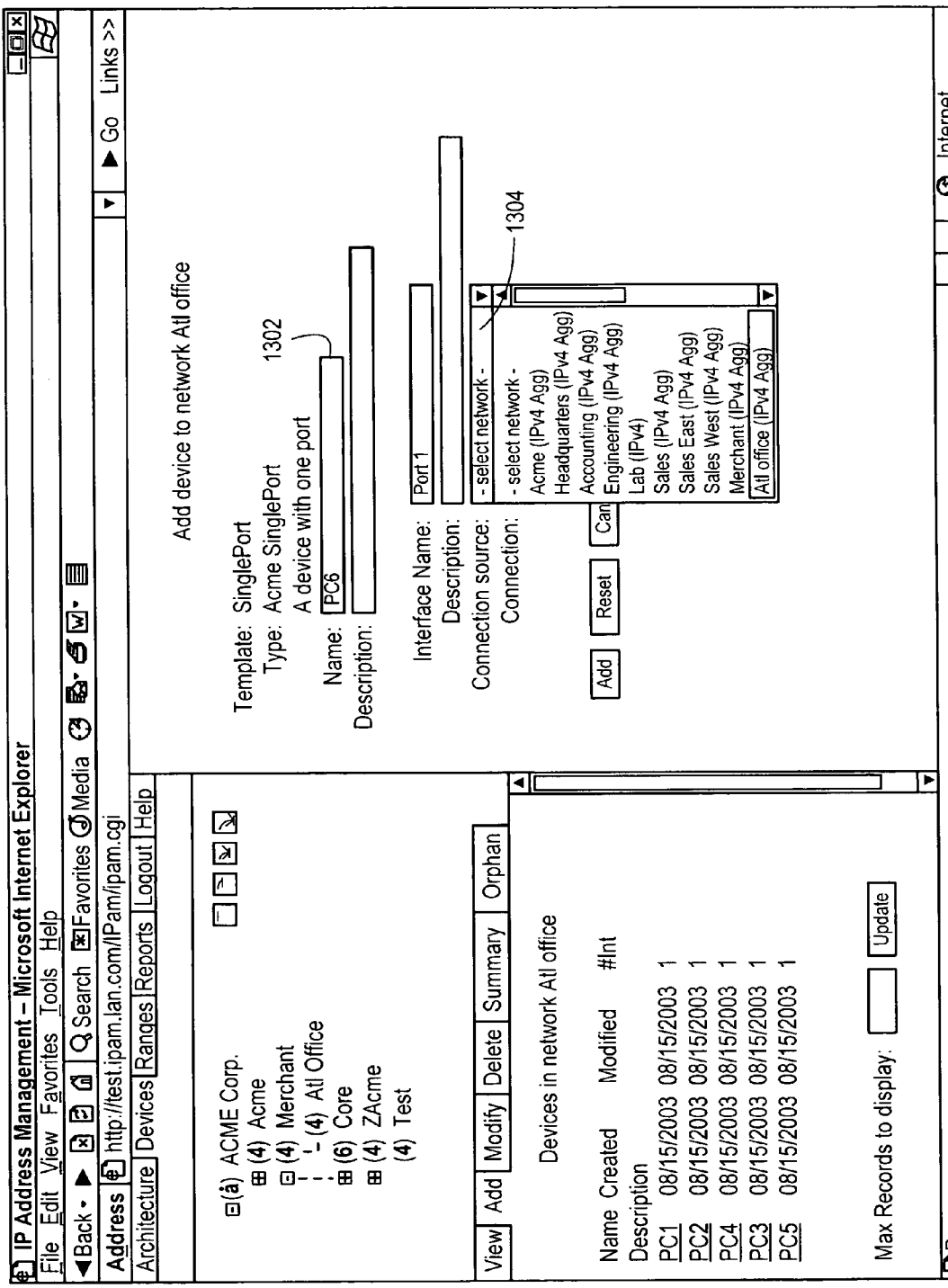

FIG. 13 shows an illustrative screenshot 1300 where the user is completing the addition of the device to the network by providing additional information for the manager application. The user specifies the name 1302 and other details as desired such as a more detailed description for the device. The interface name for the device may be provided and may be altered as desired by the user, along with a more detailed description for the interface. The user may select the connection source from a drop down menu of the networks. In this example, the user has selected the "Atl office" as the connection source for the single port device being added to the "Atl office" network.

Figure 14:
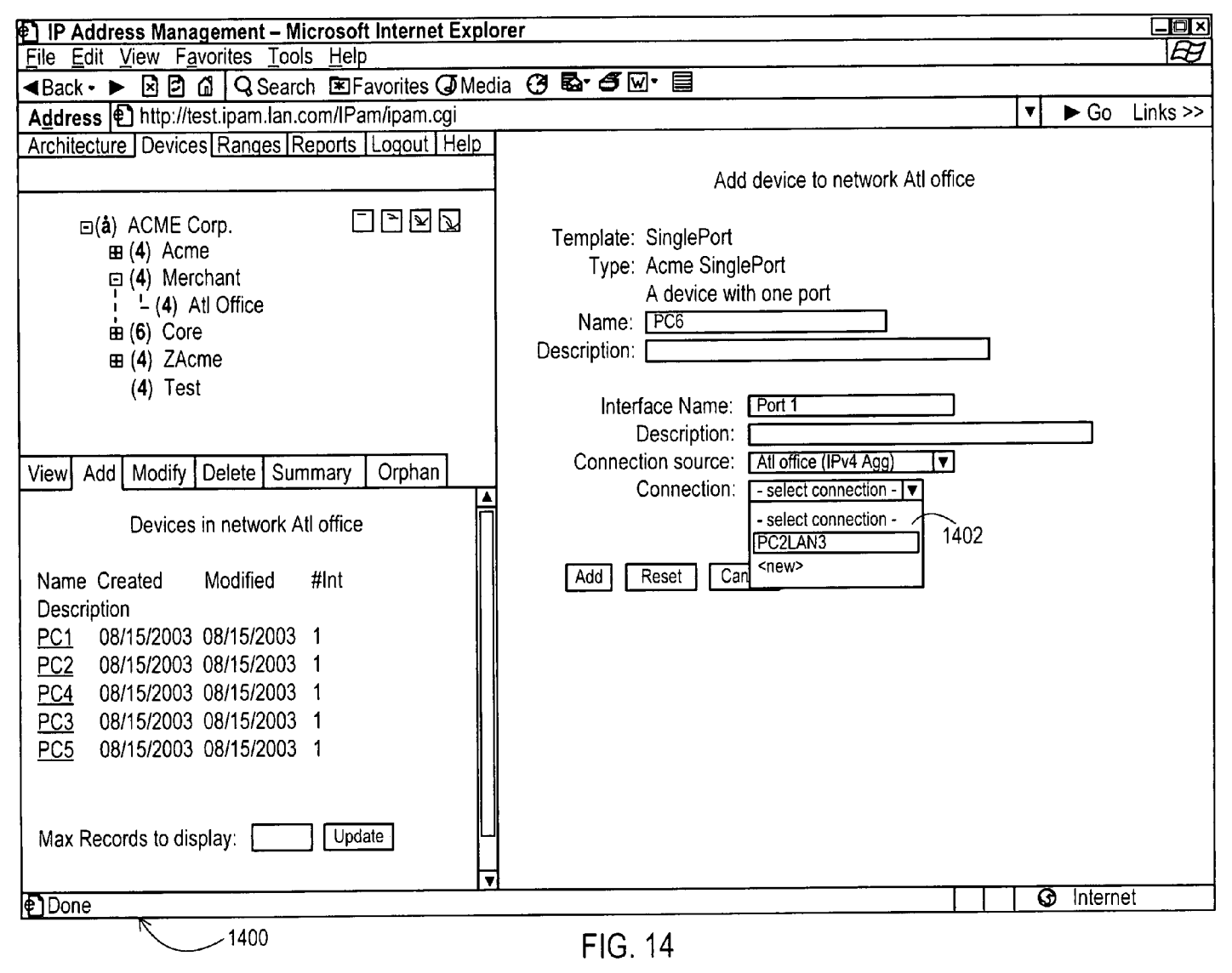
Figure 15:
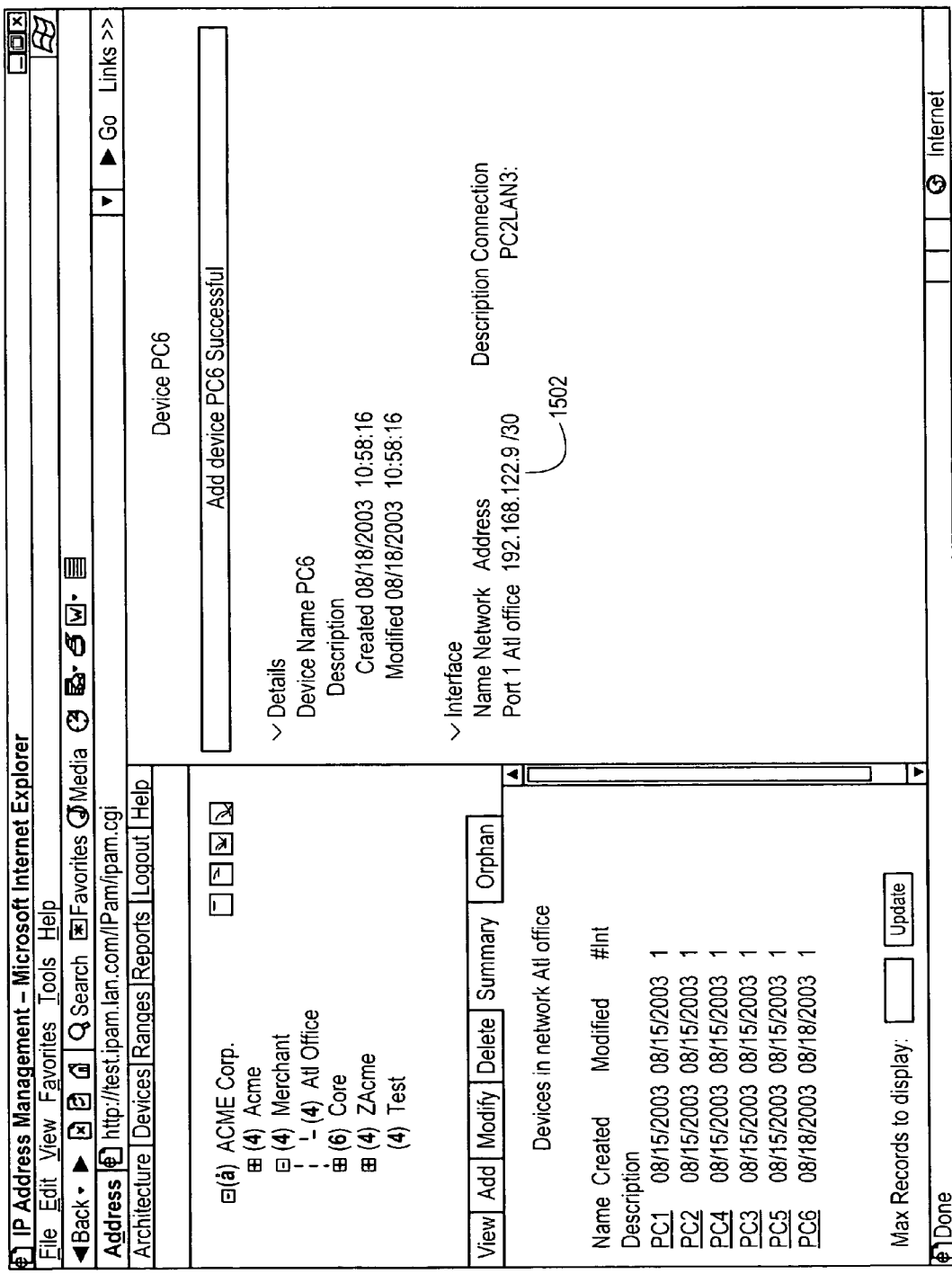
FIG. 15 shows a screenshot where the address block for the new device is shown.

FIG. 14 shows an illustrative screenshot 1400 where the user has selected the connection source and must now select the connection for the single port device. A drop down menu 1402 is provided to allow the user to select between an existing connection that is available for the device or to opt to create a new connection. In this example, the user selects the existing connection that is available. The overall status of the block is not changed because the block is allocated to the connection as a unit. However, this action selects a single address that is available within the connection and changes its status to indicate its assignment to the device interface. Therefore, in this example, the allocation operations of FIG. 3 might not be fully utilized. The selection of an address is limited to selecting a single address from the available addresses within the connection block. FIG. 15 provides a screenshot 1500 that shows that the new device connection is assigned to the address block 1502 for the chosen connection.

An alternative method of tracking the connection block is to mark each block within the connection separately, using an "available" status for those addresses within the connection but not allocated to an interface. In this case the allocation action will change the status of the individual address but not affect the other addresses within the block.

Figure 16:
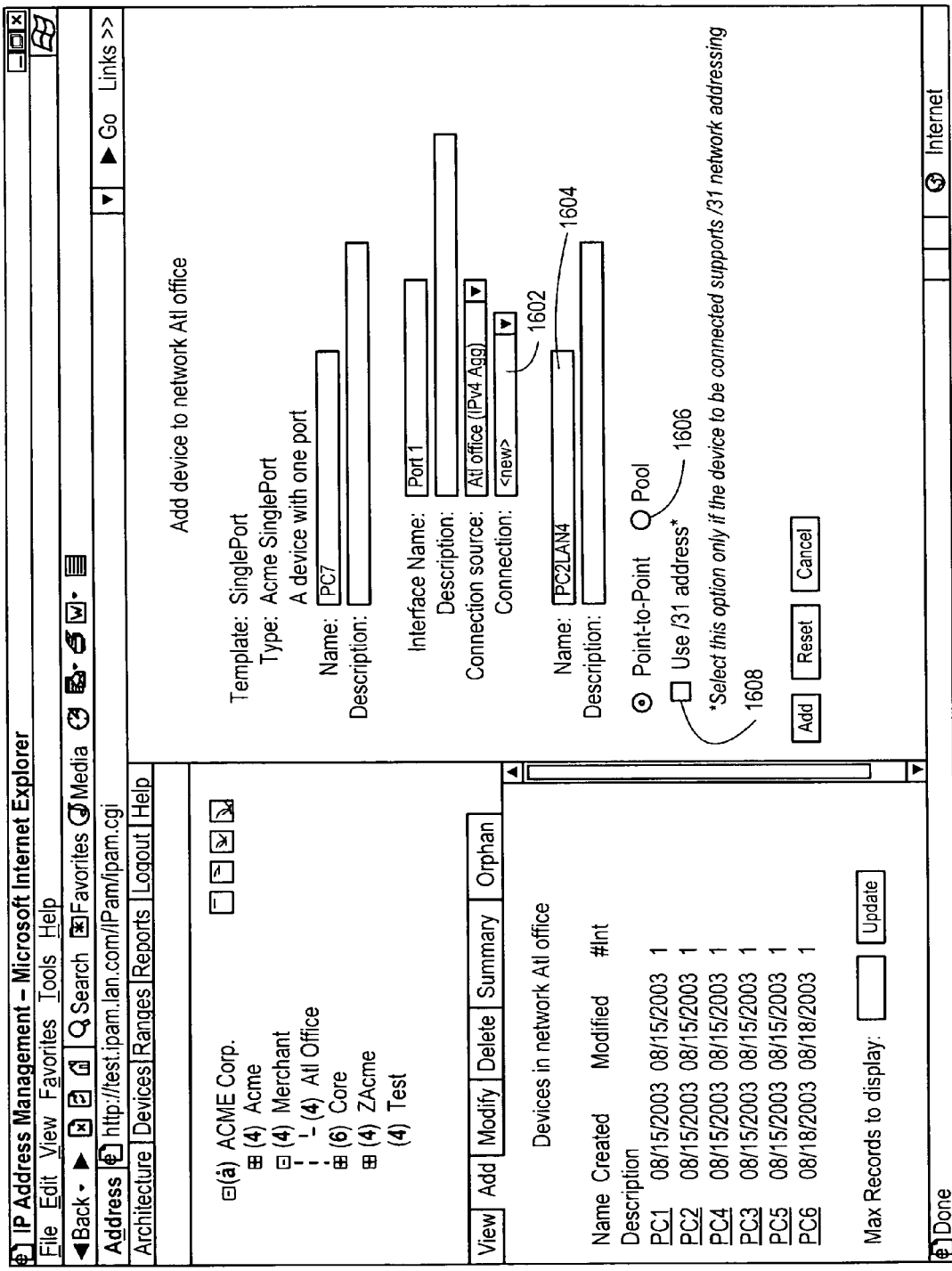
FIG. 16 shows a screenshot where the user is creating a new connection for the device being added.
Figure 19:
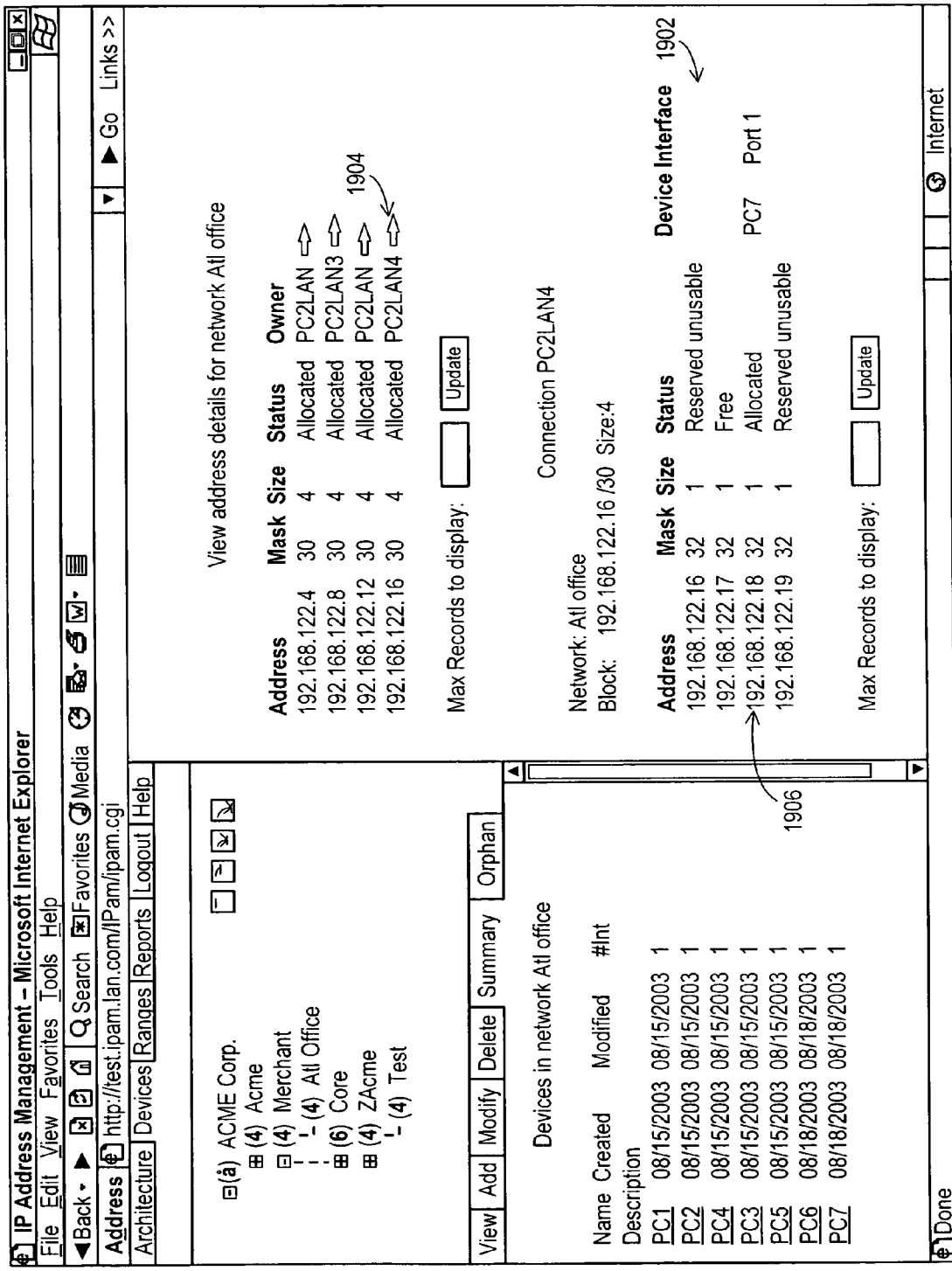
FIG. 19 shows a screenshot where a summary of a connection is shown upon selection by a user.
Figure 20:
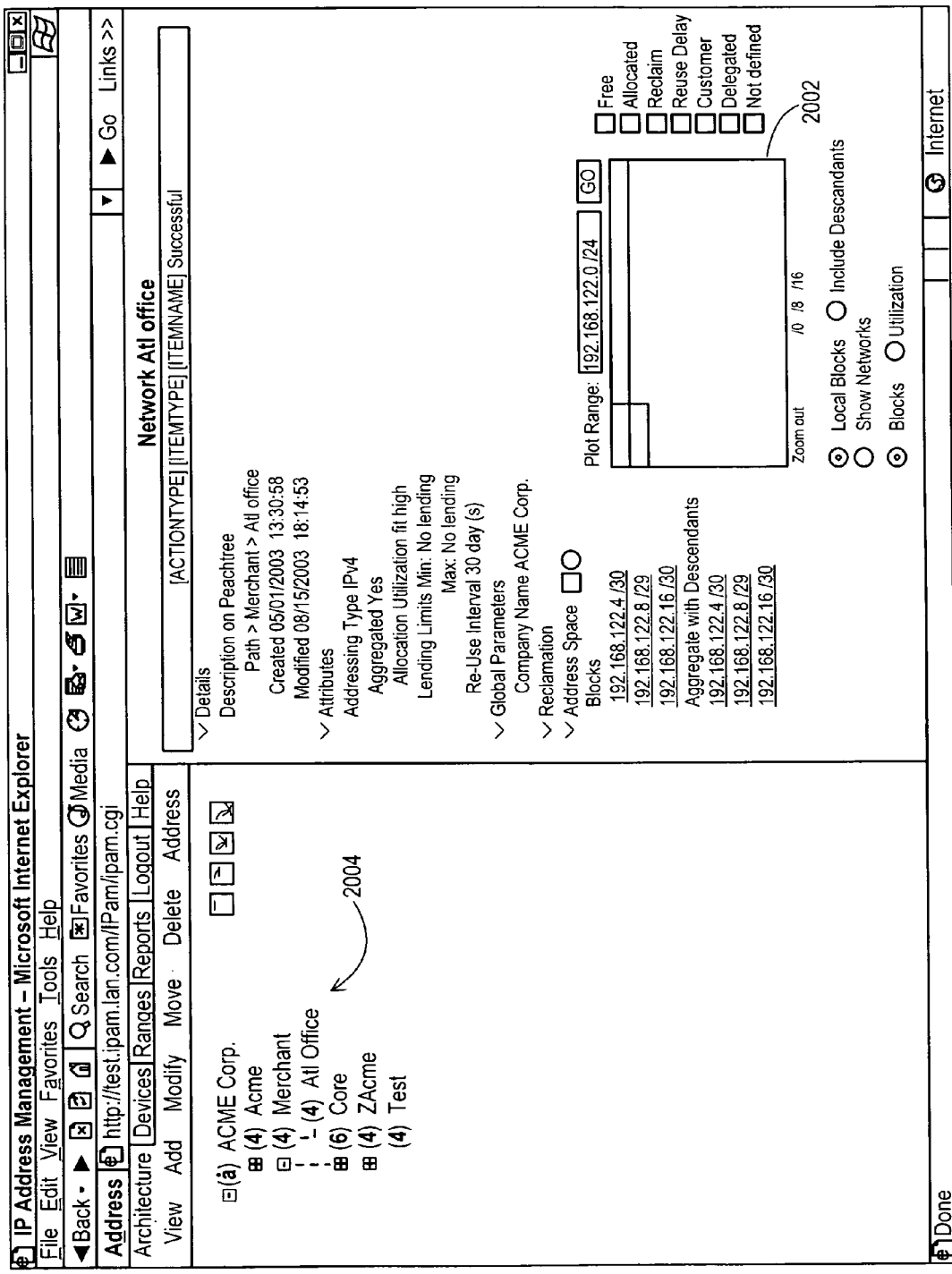
FIG. 20 shows a screenshot where a map of address space reflects the allocation of an address block for the newly added device.
Figure 21:
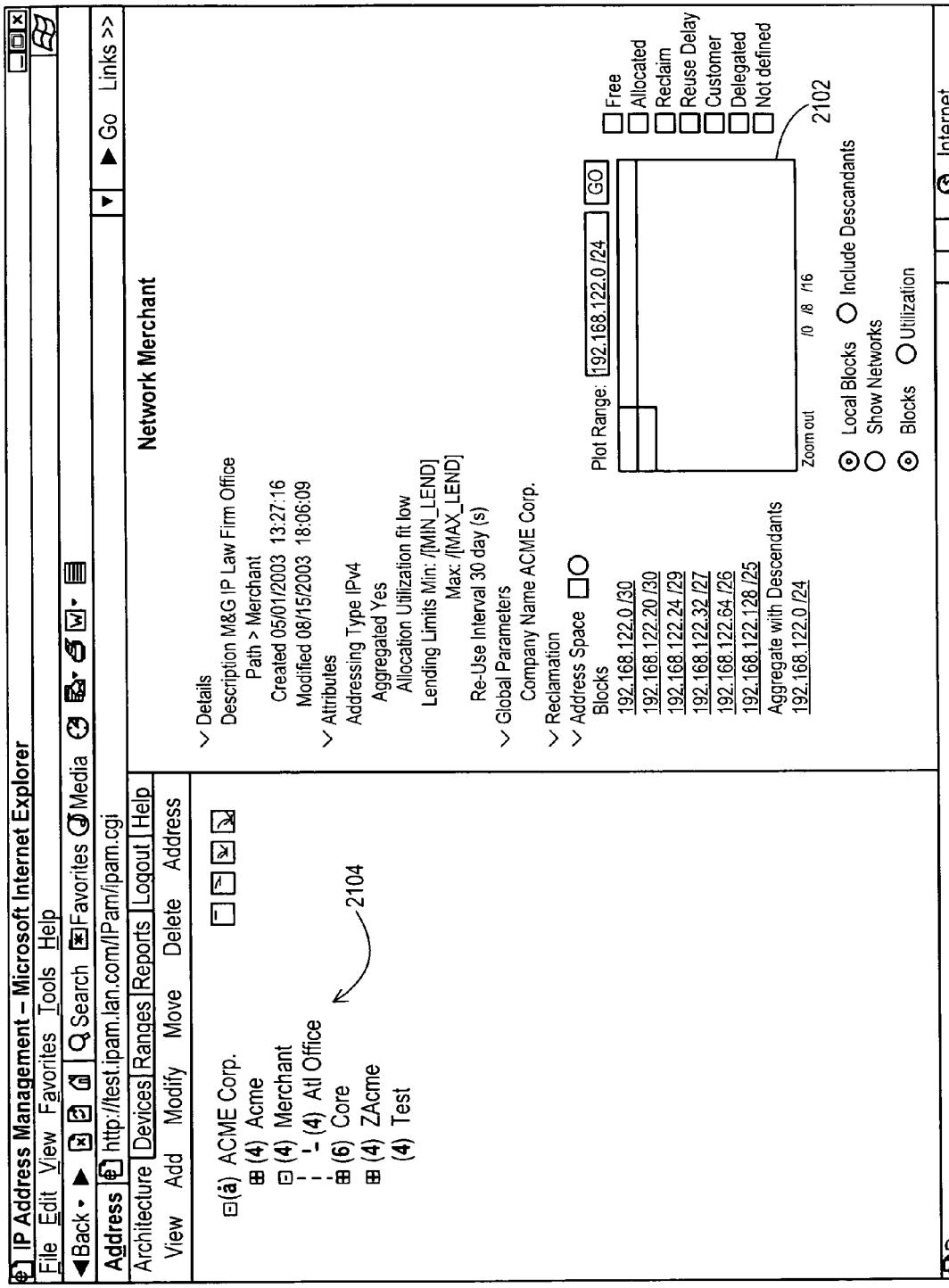
FIG. 21 shows a screenshot where a map of address space reflects that a block of address space is undefined after a lend operation moved the space to another network.

However, FIG. 16 provides an illustrative screenshot 1600 where the user opts to create a new connection from the drop down menu 1602. The user provides a name in field 1604 for the new connection and at option 1606 selects either to have a point-to-point connection or a pool connection. A point-to-point connection contains only two usable addresses, where a pool connection contains more. IP addresses in particular reserve the first and last address from each block for a special purpose. A block of four addresses is used for a point-to-point connection, where two addresses are reserved and the remaining two are available for use. Block details 1902 in FIG. 19 show an example of address reservation in a /30 block. Pool addresses are available as any larger size block of the form $2^n$, where 2 addresses are reserved and $2^n-2$ are available and are used to support multiple access network segments, such as LANs. Additionally, at option 1608, the user selects whether to use a /31 addressing, which may only be used if a device supports /31 network addressing. In IPv4, /31 represents a block of two addresses which would normally both be reserved. These devices may be configured to ignore the reserved addresses in blocks of size two and interpret them both as usable addresses.

Figure 33:
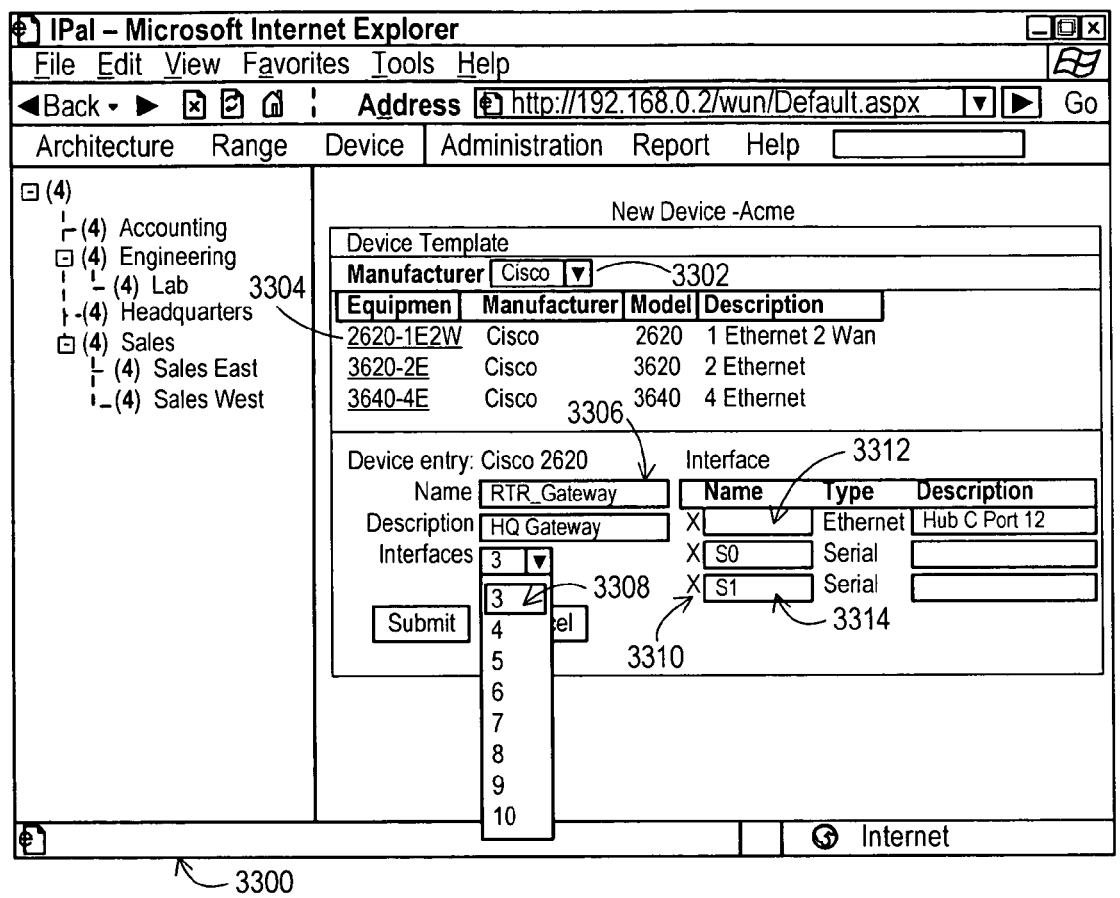
FIG. 33 shows a screenshot where a user may add a device to a network by selecting a device template and then may also manipulate the parameters of the device defined by the template.

FIG. 33 provides an illustrative screenshot 3300 of an alternate application in which the user is adding a device. The user has selected a template group from menu 3302 to display the list of available templates with descriptions. The user has then selected template 3304 '2620-1E2W' to begin creating a device of type "2620" predefined with one Ethernet and 2 serial ports. The user enters descriptive information for the device in fields 3306. The user may increase the number of interfaces that will be defined in this instance of the device by making a selection from drop down menu 3308. The options in this menu 3308, and therefore the number of interfaces that may be created on this device, is controlled by the device template. The user may also delete the predefined interfaces by selecting the delete buttons 3310. The interface names and descriptions may also be predefined in the templates to provide consistent naming with external systems or hardware configurations, allowing the allocated interface addresses to be accurately mapped to live network hardware or external monitoring applications. The grayed field 3312 indicates that interface name "E0" may not be changed, while fields 3314 with interfaces S0 and S1 are editable.

Figure 34:
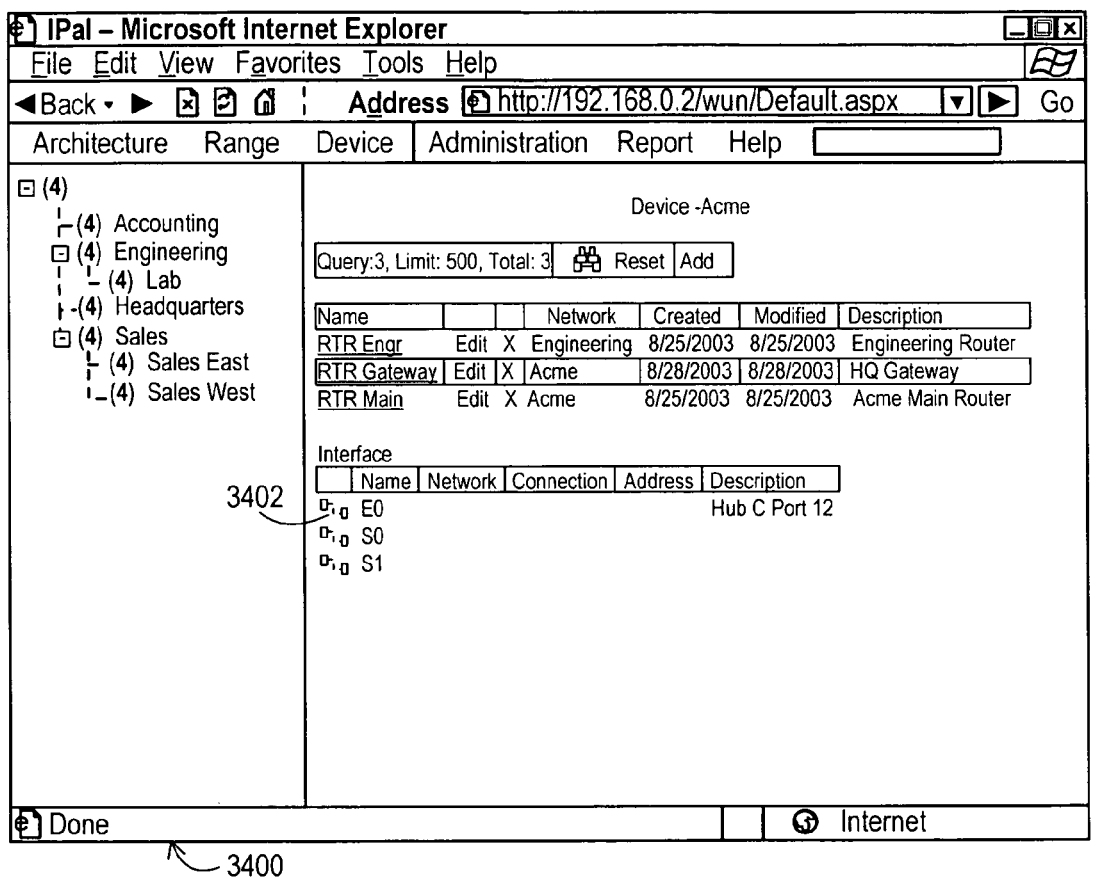
FIG. 34 shows a screenshot where the result of successfully creating a device is shown but is prior to allocating any address space of a network for the device.

FIG. 34 provides a screenshot 3400 that shows the result of the successful creation of the device, before any addresses are allocated for it. Selecting button 3402 presents the user with allocation options as shown in screenshot 3500 of FIG. 35. In this screen, the user selects the source network for the allocation from network menu 3502. The user then selects whether to use an existing connection or a new connection through selector 3504. The "available" selector is disabled to indicate there are no connections with available addresses in the selected network. The options for defining a new connection are displayed in box 3506. The user has selected a point-to-point connection. The "Use /31 address" option 3508 is disabled because the template defined this interface on this device type to be unable to support this option.

Device templates may be further defined to restrict the addresses types that a device or specific interface may support. Through mapping of the represented interface to live network equipment, a device template may also be defined to represent multiple logical interfaces per physical interface on a physical device.

Figure 35:
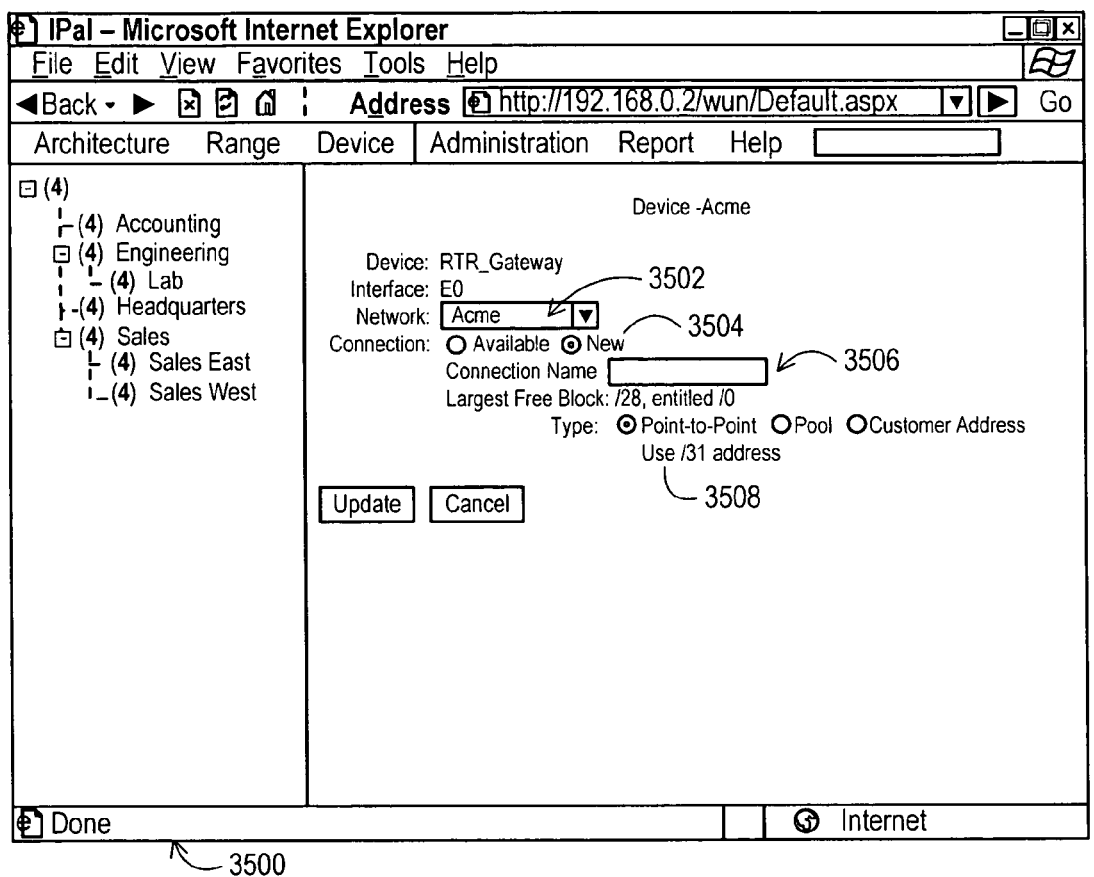
FIG. 35 shows a screenshot where a user may add the device that has been created to the chosen network which may involve selection of an available connection or creation of a new connection.

Upon the user completing this information of FIG. 16 or FIG. 35, the manager application then begins the logical operations of FIG. 3 to allocate a free block of the "Atl office" network for the new connection. The find free operation 300 attempts to find a block for the chosen network that is free and can be allocated for this new connection. The details of the free block operation 300 are discussed in more detail below with reference to FIG. 5.

Figure 5:
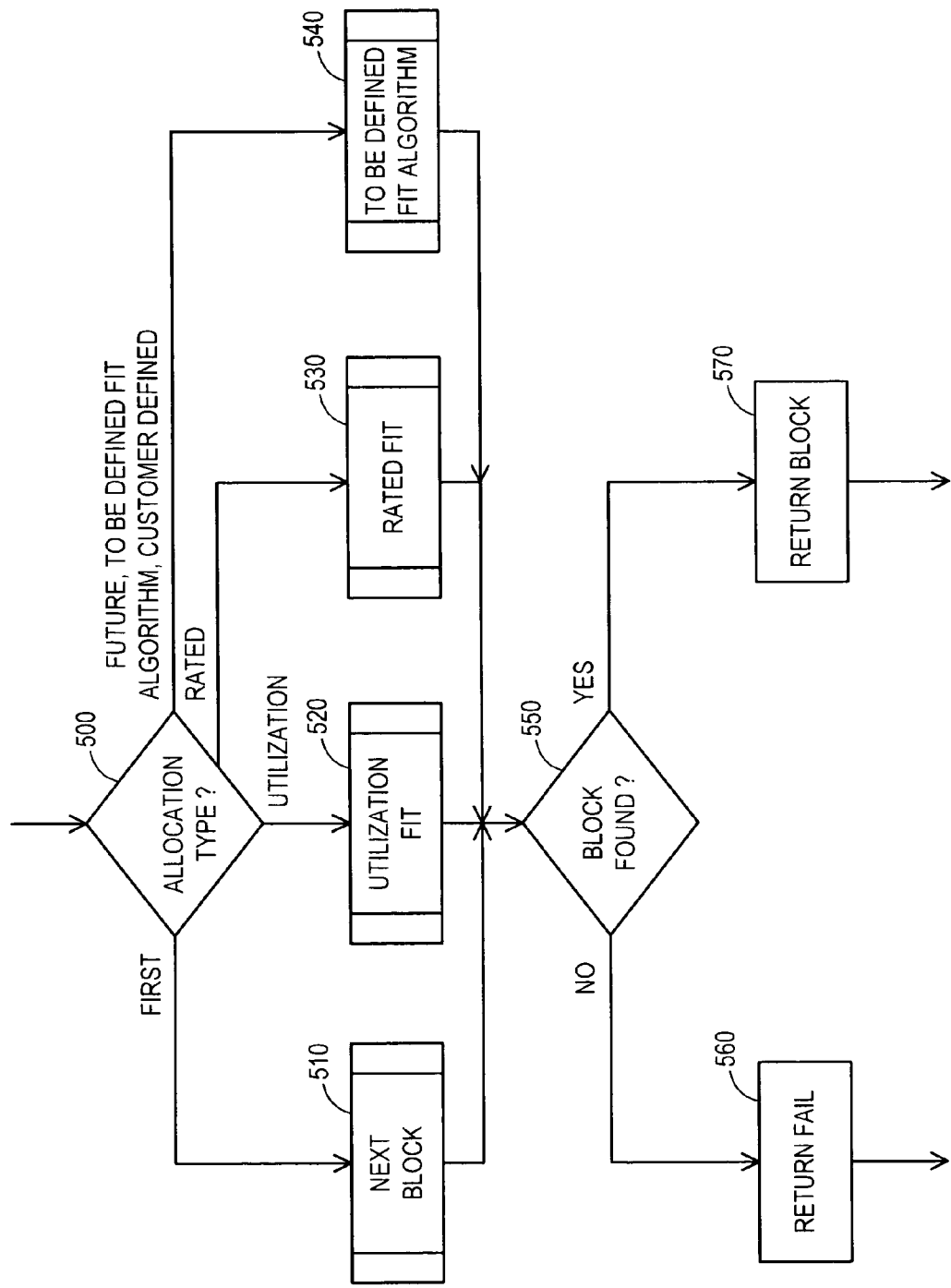
FIG. 5 shows an operational flow of an embodiment for finding a free block as used in the operational flow of FIG. 3 when attempting to allocate networking address space.

As shown in FIG. 5, the free block operation 300 begins at query operation 500 which detects which allocation type has been specified for the current network. The allocation type is originally specified when the network is added to the corporation, but the allocation type may be modified by the user thereafter. FIGS. 23-26, discussed below, provide screenshots that show a network having its parameters such as allocation type modified by a user. Thus, query operation 500 detects what the current allocation type is for the network. Once the allocation type is detected, the free address block is selected accordingly.

The allocation type may be one of several types. The allocation type may be "next block" which selects the next block by numerical order of address according to the allocation order configured for the network. When "next block" is the allocation type, the free block is chosen at next block operation 510 which is described in more detail below with reference to FIG. 6.

The allocation type may be "utilization fit." The utilization fit selects a block of the smallest available size that is of sufficient size to satisfy the allocation request. Utilization fit may be fit high or fit low by numerical order of address. When utilization fit is the allocation type, the free block is chosen at utilization fit operation 520 which is described in more detail below with reference to FIG. 7.

The allocation type may also be "rated fit." Rated fit selects a block with the best rating derived from the block characteristics of size and aggregation with other blocks and is dependent upon the reason for the allocation. Rated fit may also be fit high or fit low. When rated fit is the allocation type, the free block is chosen at rated fit operation 530 which is described in more details below with reference to FIG. 8.

The allocation type may be of some other type as well, such as a type that has been defined in an implementation enhanced with one or more other allocation types. When this other type is selected, the free block is chosen at fit operation 540 according to the rules defined for this particular allocation type.

Once the find operations have completed, query operation 550 of FIG. 5 detects whether a block was successfully found. If not, then a fail is returned by the free block operation 300 at fail operation 560. If a free block is successfully found, then the block is returned by the free block operation 300 at block operation 570.

Upon the free block operation 300 of FIG. 5 returning a block, operational flow proceeds to query operation 340 where it is determined whether the returned block is larger than the requested size. The requested size may be determined by the size necessary to support a new connection being requested by the user as discussed above with reference to FIG. 16, or may have been explicitly set by the user by requesting that space be selected from the network and be given an allocated status.

Figure 22:
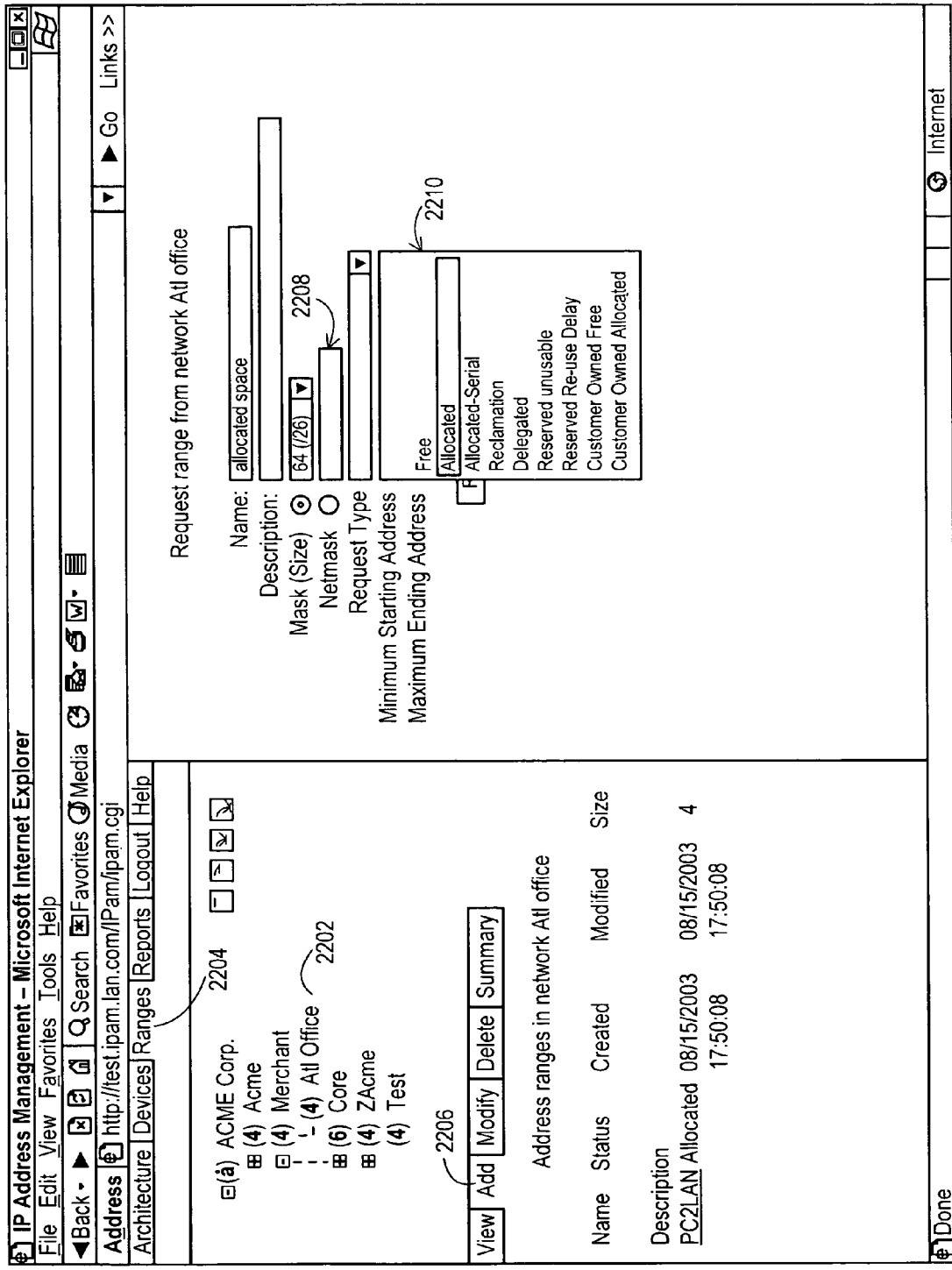
FIG. 22 shows a screenshot where a user is adding a new range of allocated space.
Figure 24:
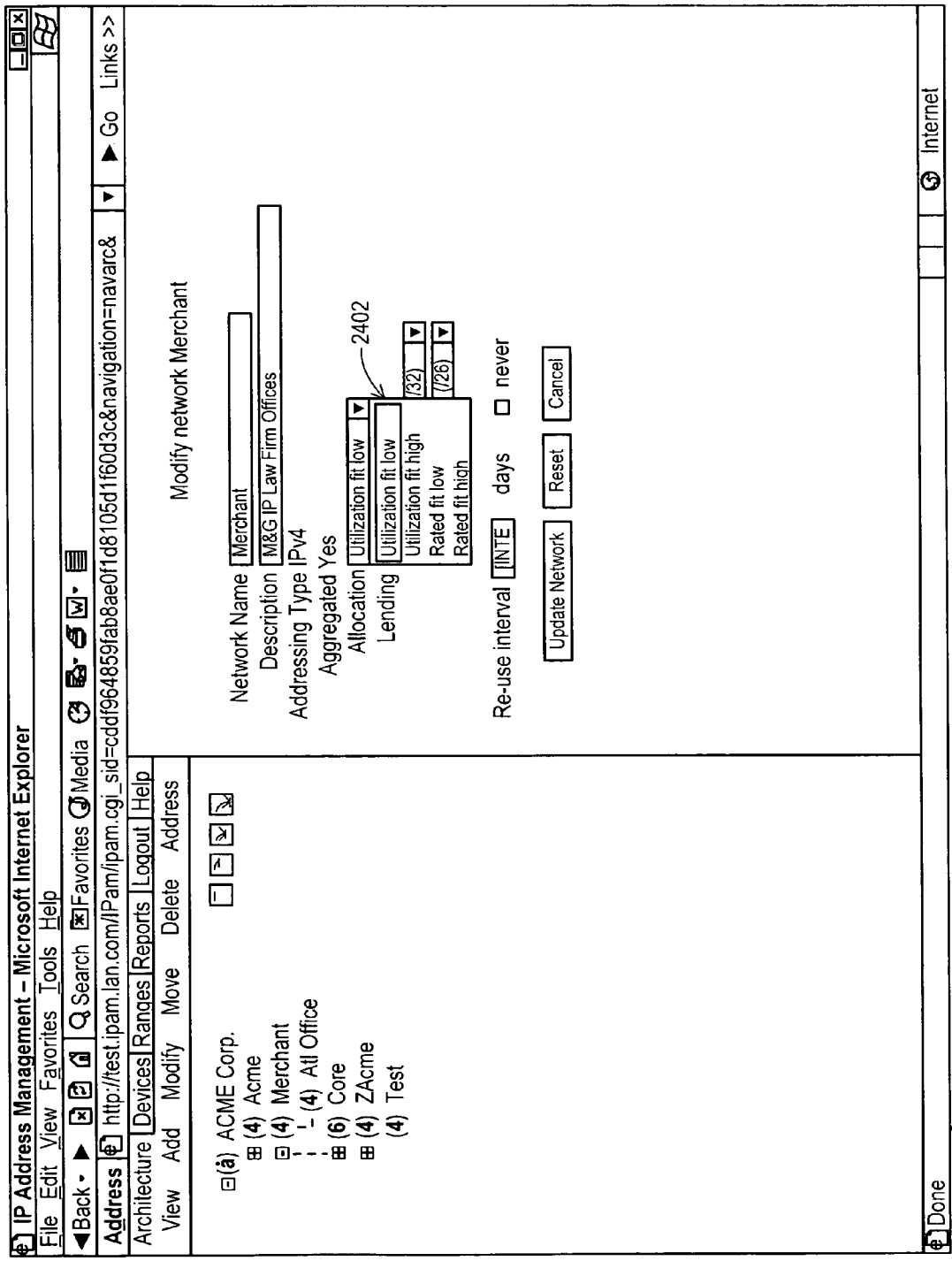
FIG. 24 shows a screenshot where a user is selecting an allocation type and order for a network.
Figure 25:
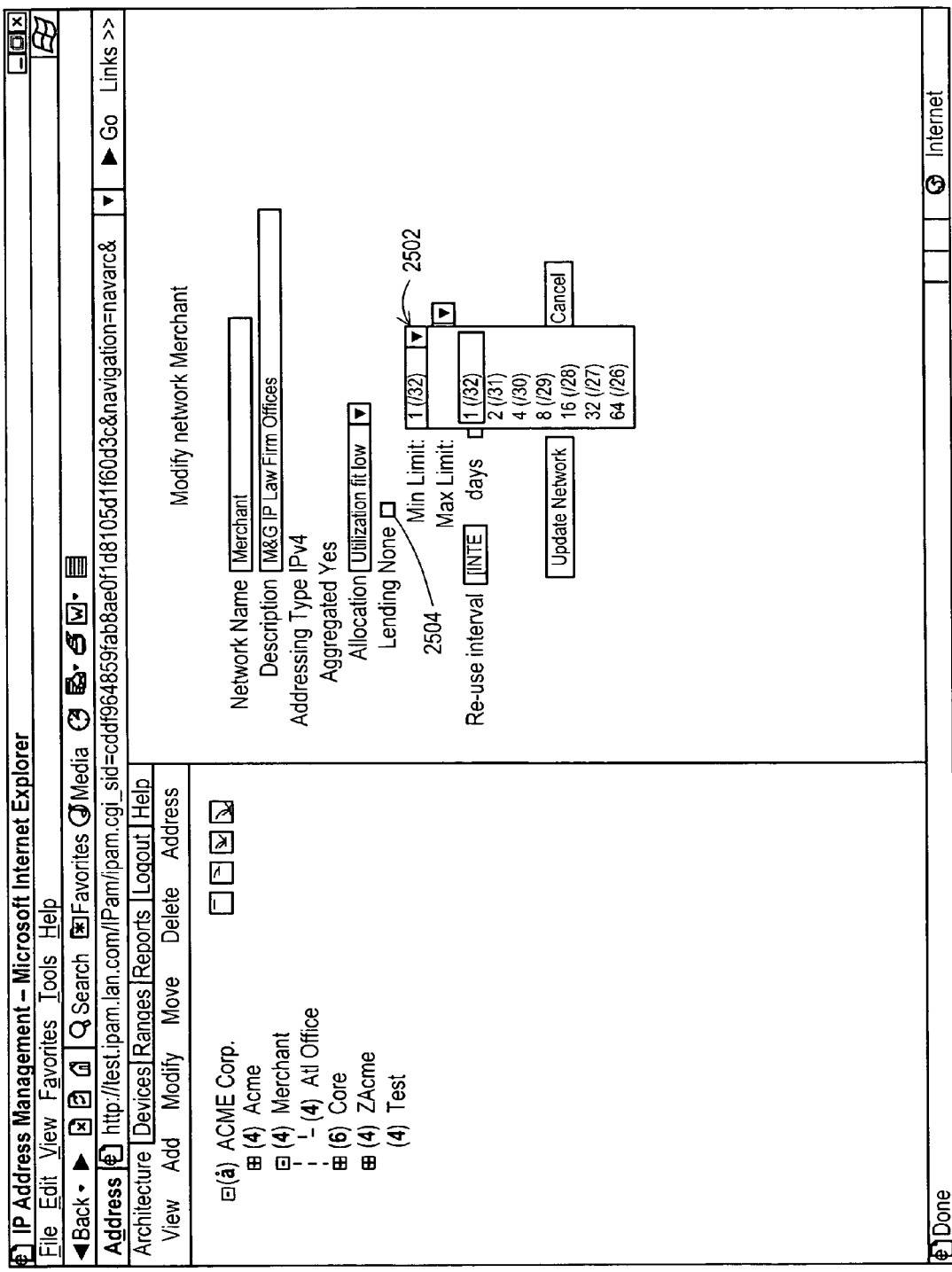
FIG. 25 shows a screenshot where a user is selecting a minimum lending limit for a network.
Figure 26:
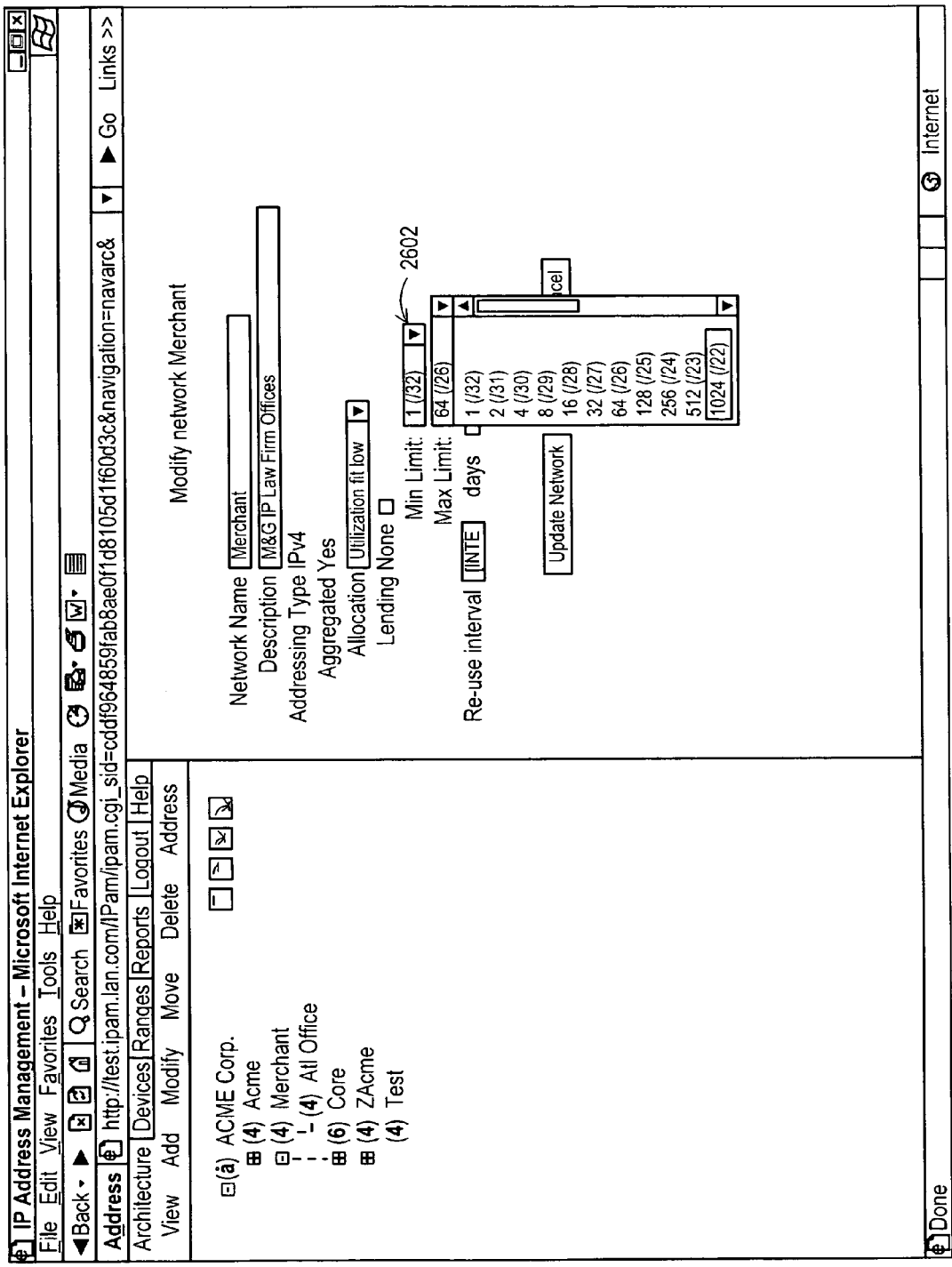
FIG. 26 shows a screenshot where a user is selecting a maximum lending limit for a network.

FIG. 22 provides a screenshot 2200 that shows an example where a user requests that a defined range of address space be selected from a current network and be given a specified status once the block of the requested size is found. This option allows the assignment of alternate statuses to the block. The user selects the network 2202, the ranges button 2204 and then add button 2206 to reach the request page that includes the range size fields 2208 as well as the request type drop down menu 2210. The range size fields 2208 allow the user to specify the size of the range to add for the current network by entering a mask size, a netmask, or as another alternative not shown in FIG. 22, by entering the starting and ending addresses to use. Where the user enters the size of the range by selecting a mask or a netmask, the user may also specify the minimum starting address and/or the maximum ending address to restrict the address of the range to be added.

Returning to query operation 340 of FIG. 3, if the block is not larger than the requested size, then operational flow proceeds to status operation 360 where the status of the returned block is changed within the definitional listing to a new status. The status may be set to the requested status where additional processing may occur prior to setting the status to be allocated. Such additional processing may include transferring the block to another network, or updating additional tables in the definitional listing with information about the allocation, for example device and interface identification. Where no such additional processing is required, the status may be set to "allocated," "connection," or some other status name representing that this block of addresses is no longer free but is or soon will be in use in the network.

Where query operation 340 finds that the block is larger than the requested size, then split operation 350 splits the block in half and selects the upper or lower half according to the allocation order currently set for the network within the definitional listing. The remaining unselected half is returned to the network and keeps its status as free. Query operation 340 then detects for the selected half whether it is larger than the requested size. If so, then operational flow returns to split operation 350 where the selected half is split. This splitting continues until the selected half is no longer larger than the requested size so that operational flow proceeds to status operation 360.

If this operation fails to return a block, under certain conditions the process may attempt to acquire additional address space from another network to satisfy the request through the lending process. Returning to find free block operation 300, if this operation fails to return a block because a free block for a specified range of the network, if a range has been specified, could not be found for the requested size, then operational flow proceeds to query operation 310. Query operation 310 detects whether a block of the requested size exists for the current network regardless of the address range. If it does exist, then a fail is returned at fail operation 330 and the failure notification to the user may specify that the fail results from the specified range not having a satisfactory free block but that the network does contain a satisfactory free block outside of the specified range. This fail occurs to prevent an unnecessary lend from occurring from another network when the current network has a free block that will satisfy the request if the range restriction is removed.

If the user has not specified a minimum and/or maximum to the range, as noted above for FIG. 22, then query operation 310 is omitted and operational flow proceeds directly to lend operation 320. Also, if query operation 310 is not omitted due to the user specifying a minimum and/or maximum to the range and query operation 310 detects that the current network does not have a free block of at least the requested size regardless of the specified range, then operational flow proceeds to lend operation 320. Lend operation 320 is discussed in greater detail below with reference to FIG. 4. The lend operation 320 attempts to lend address space from an ancestor network (i.e., higher up the path in the tree structure) to a descendant network to satisfy the request for allocation of a block. If the lend fails, operational flow proceeds to fail operation 330 which returns a fail to the user. If the lend succeeds, operational flow proceeds to query operation 340.

When an allocation according to the logical operations of FIG. 3 succeeds, then the user may be provided with various visual indications of the successful allocation. As shown in the screenshot 1700 of FIG. 17, an added device and interface is shown with the address 1702 selected from the new connection block. The interface address is an individual address while the mask gives the size of the associated connection block. For another example of requesting that address space be allocated by directly specifying the size and status, such as shown in FIG. 22, a successful indication of the allocation of address space is shown in the screenshot 3100 of FIG. 31.

Figure 17:
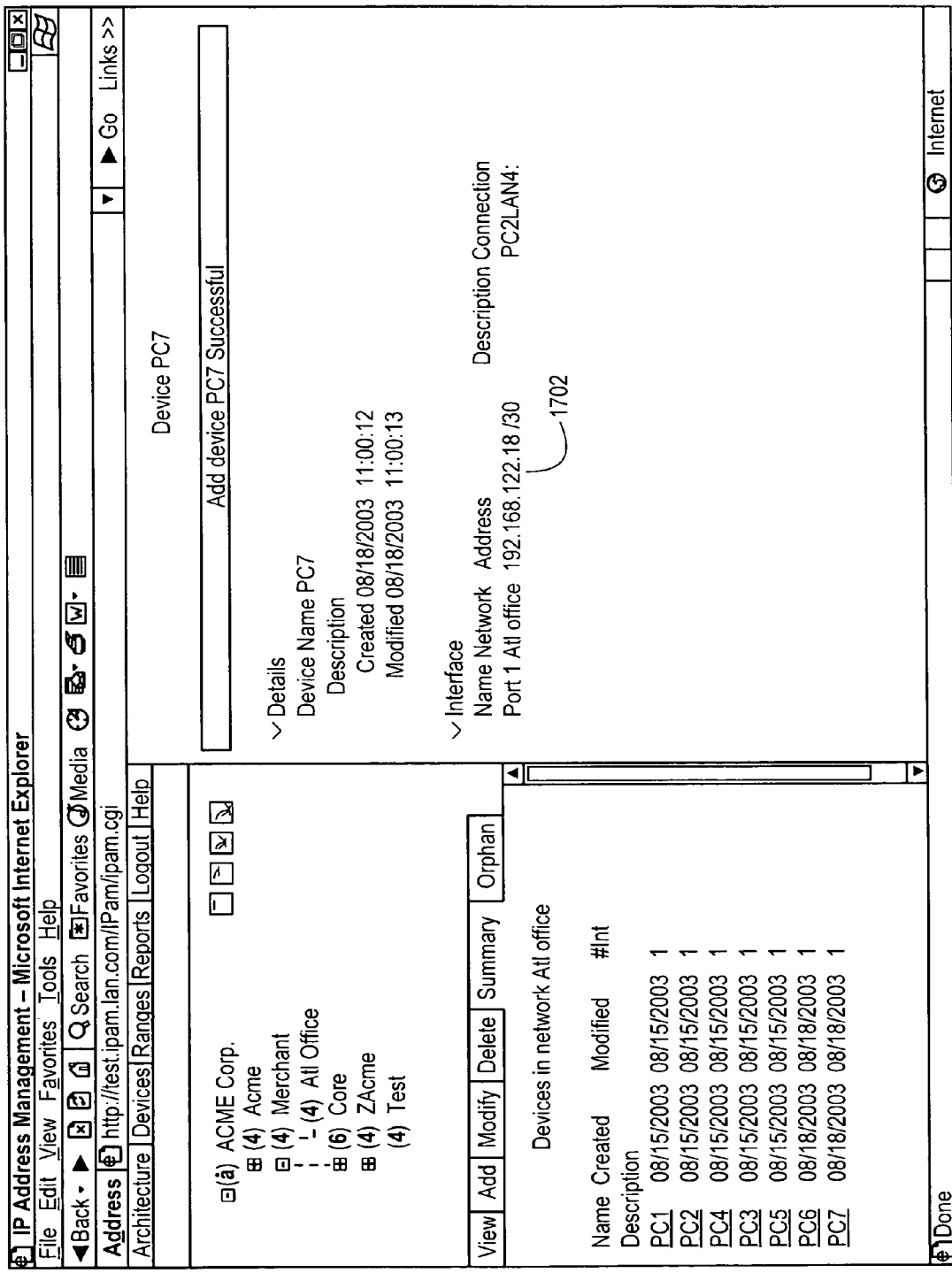
FIG. 17 shows a screenshot where the newly allocated address block for the new device is shown.
Figure 18:
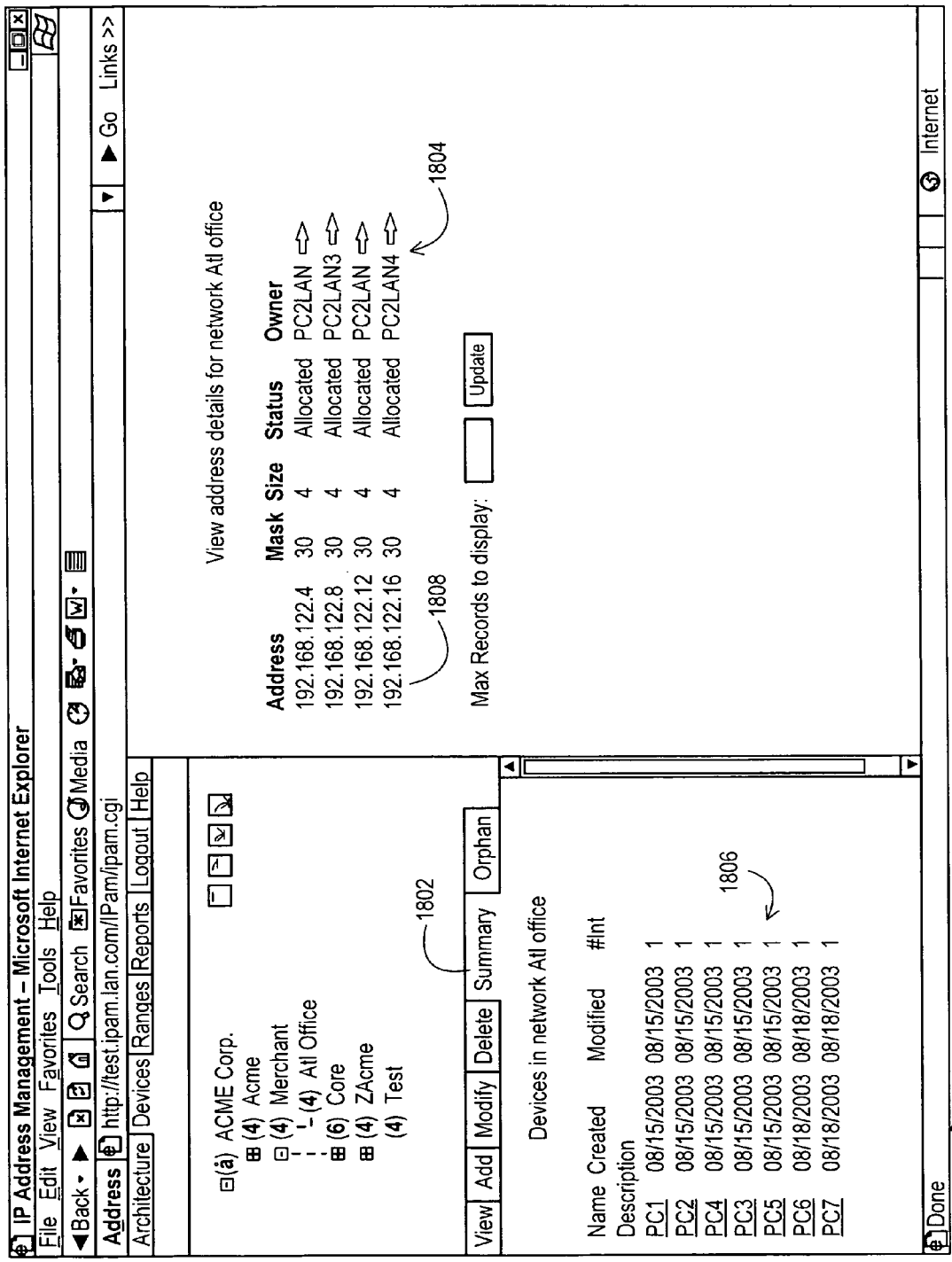
FIG. 18 shows a screenshot where the new connection and corresponding newly allocated address block for the new device is shown.

Returning to the example of FIG. 17, upon completing the successful allocation and display of the added device with the newly allocated address block, the user may select to see the summary of devices as shown in the screenshot 1800 of FIG. 18. The list of devices 1806 now includes the new device while the list 1804 of address details for the current network reflects the new connection for the device which is assigned to the newly allocated address block 1808 for the owner connection. As shown in the screenshot 1900 of FIG. 19, the arrow 1904 beside each block of addresses for the current network may be selected to display the details of that block in a list 1902 which sets forth the individual addresses, their status, and any device details associated with an address. Address 1906 indicates the individual address assigned to the new device interface.

In the example shown, the block of addresses 192.168.122.16/30 allocated for the "Atl office" network was borrowed from the ancestor network "Merchant" using the lend operation 320. As shown in the screenshot 2000 of FIG. 20, a map 2002 showing the address space for the selected network 2004 shows the 192.168.122.16/30 block as allocated for the "Atl office" network. Screenshot 2100 of FIG. 21 includes a map 2102 that shows that particular block being undefined for "Merchant," the selected network 2104, since the lend operation 320 took the address space from "Merchant" network and provided it to the "Atl office" network.

Figure 4:
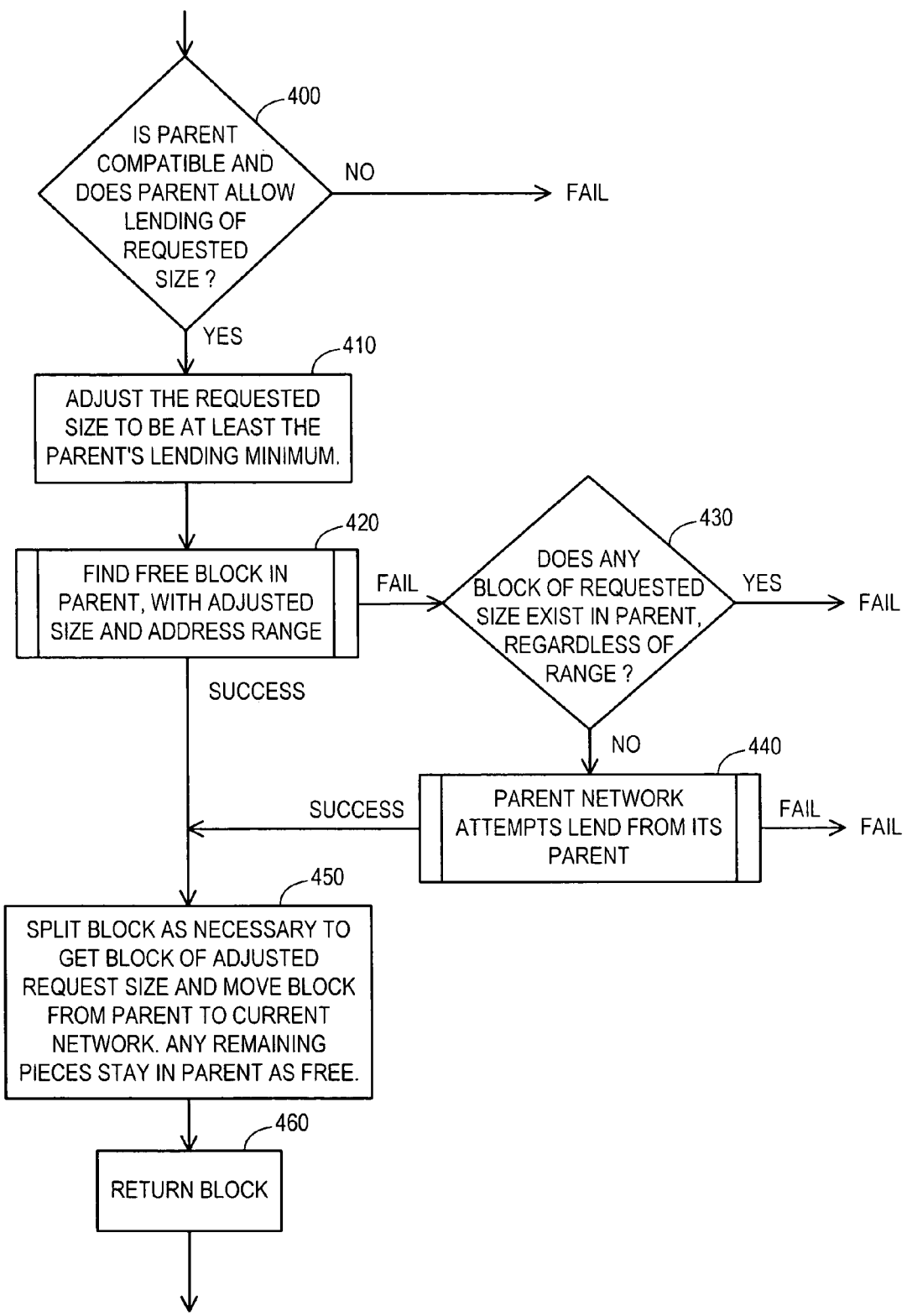
FIG. 4 shows an operational flow of an embodiment for lending networking address space from one network to another, as used in the operational flow of FIG. 3 when attempting to allocate networking address space.

The details of the lend operation 320 are shown in FIG. 4. Lending is possible when there is a tree or other network structure. Alternately, the allocation process of FIG. 3 can happen in a flat environment, but lending will be left out, or will require some other means of identifying the lending network. The logical operations of the lend operation 320 begin at query operation 400 where it is detected whether this network may attempt lending, whether the parent (i.e., immediate ancestor) of the current network is compatible and whether the parent allows lending of the requested size. This determination is made by referring to the definitional listing for the current network and the parent of the current network. To attempt lending, the current network must be configured to aggregate, meaning it may share the same instance of address space as its parent. The ID of the parent network for the current network is found from the listing for the current network and then this ID is looked up to find the listing for the parent. The type category is then referenced to determine whether the type for the parent matches the type for the child. For example, an IPv4 parent may lend to an IPv4 child, but not to an IPv6 child or an ASN child. Also, the lending limits category for the parent is referenced to determine whether the maximum limit, if lending is allowed, is set to at least as large as the size of the requested block. If the aggregation setting for the current network is no, the type is not a match or the lending size is not adequate, then the lending operation returns a fail.

Where query operation 400 finds that the parent is compatible and the lending limits of the parent are adequate, then operational flow proceeds to adjustment operation 410 where the requested size is adjusted so that it is at least as large as the minimum lending limit set for the parent. The minimum lending limit tends to prevent excessive fragmentation of address space in ancestor networks. Then, free block operation 420 attempts to find a free block in the parent network that meets the requested size. Free block operation 420 proceeds according to the logical operations of FIG. 5 discussed above, where finding a free block is done according to the allocation type and order defined for the parent network in the definitional listing. When free block operation 420 succeeds, operational flow proceeds to split operation 450.

Where free block operation 420 fails to find a satisfactory free block of at least the adjusted size and within the specified range, if any, then query operation 430 detects whether a free block of the adjusted size exists within the parent network regardless of the specified range. If a free block of sufficient size does exist within the parent, then the lend operation returns a fail. However, if the parent network does not have a free block sufficient size regardless of specified range, then operational flow proceeds to lend operation 440. Also, where no range is specified in the allocation request, then operational flow proceeds directly to lend operation 440 once free block operation 420 has failed.

Lend operation 440 attempts to lend address space from the parent network of the parent. Lend operation 440 proceeds according to the logical operations of FIG. 4 beginning at query operation 400. When lend operation 400 fails, a fail is returned to the user. However, when lend operation 400 succeeds, operational flow proceeds to split operation 450.

Split operation 450 repetitively splits the block in half and keeps one half according to the allocation order and returns the other half to the parent network as free until the block is no larger than the adjusted block size. Once the block is of the adjusted block size, operational flow proceeds to block operation 460 where the block is reassigned to the receiving network and returned from the lend operation 320 to query operation 340 of FIG. 3, or from lend operation 440 to split operation 450 of FIG. 4 if all levels of lending have not yet completed to return the block to the current network.

Figure 6:
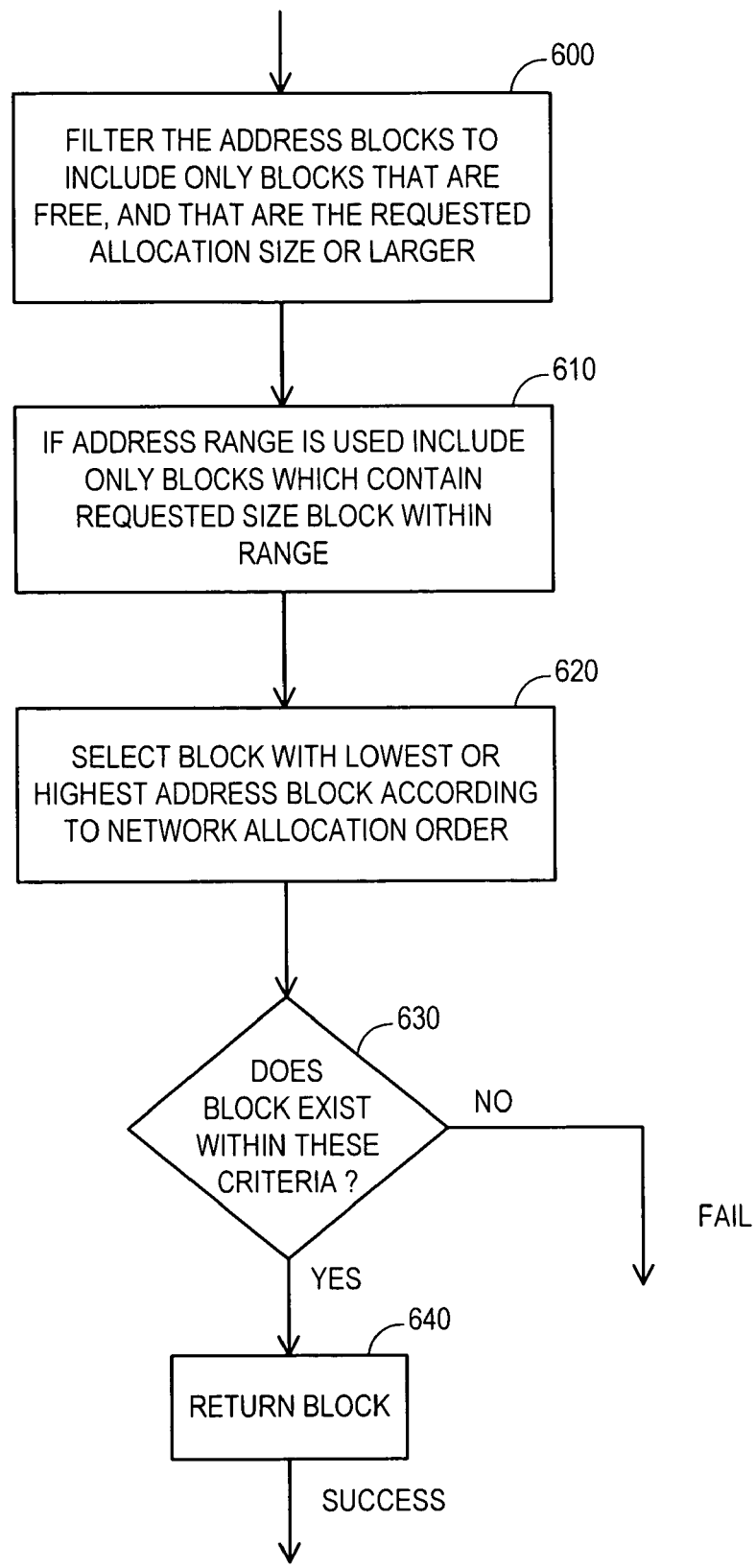
FIG. 6 shows an operational flow of an embodiment for selecting a block to allocate using a next block option as used in the operational flow of FIG. 3 when attempting to allocate the networking address space.

FIG. 6 shows the logical operations of the next block allocation type as utilized in next block operation 510 of FIG. 5. The logical operations begin at filter operation 600 where the address blocks of the network are filtered to include only blocks that are free and are of the requested size or larger. Then, at range operation 610, if an address range has been specified for the allocation request, then only those blocks that are free and of at least the requested size that are within the specified range are kept.

Once the set of blocks for the network have been filtered to eliminate those that are not free, are not of sufficient size, and/or are not within the specified range, then an attempt is made to choose a block from the set of remaining blocks, if any, at select operation 620. The block that is chosen is the highest or lowest numbered address of the remaining blocks in accordance with the network allocation order specified for the network in the definitional listing. Once an attempt to select a block is made, then query operation 630 detects whether a block remained in the set such that it was able to be selected. If not, then a fail is returned by the next block operation 510. If a block was selected, then the block is returned from the next block operation 510 at block operation 640.

Figure 7:
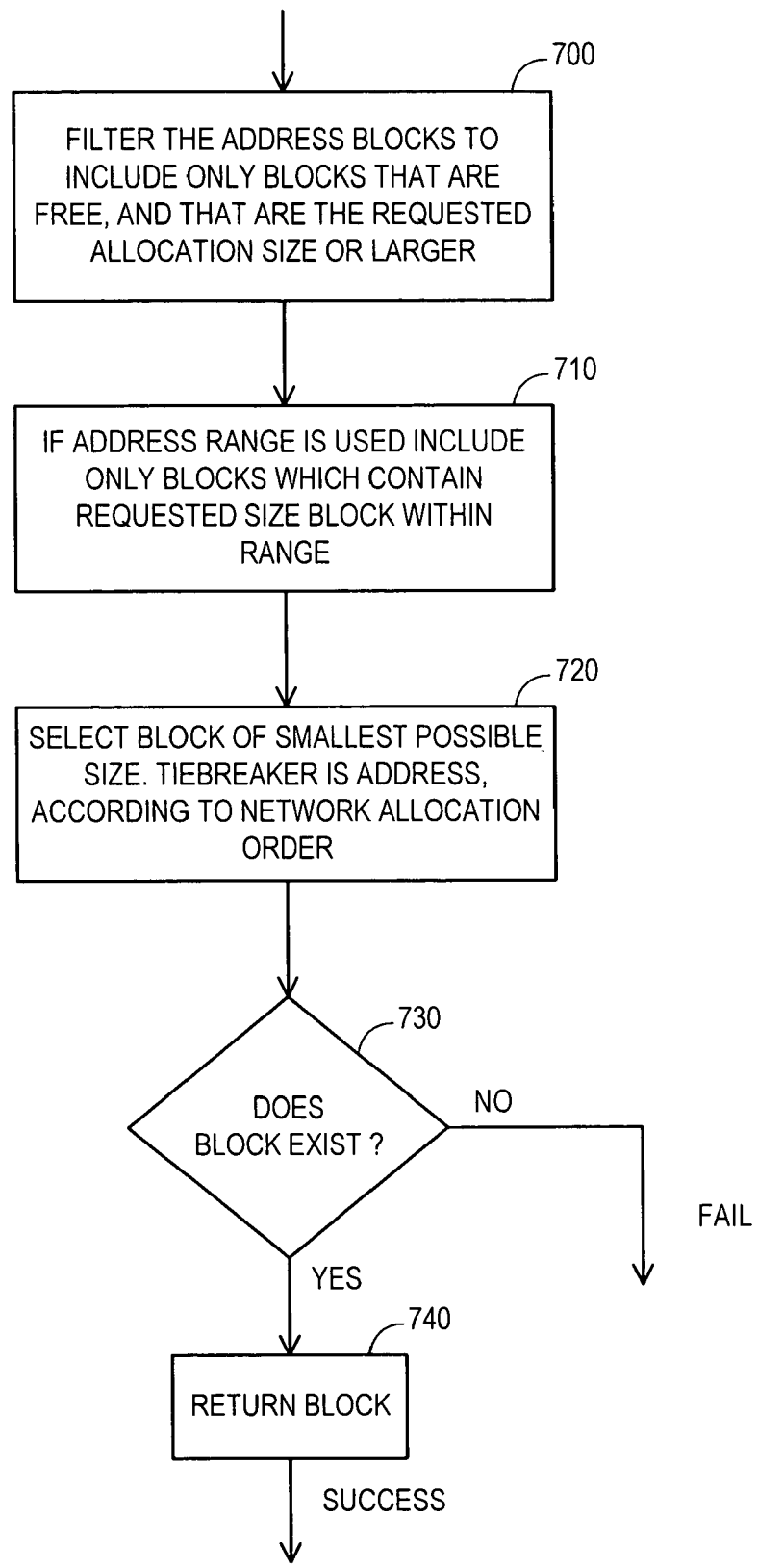
FIG. 7 shows an operational flow of an embodiment for selecting a block to allocate using a utilization fit option as used in the operational flow of FIG. 3 when attempting to allocate the networking address space.

FIG. 7 shows the logical operations of the utilization fit allocation type as performed in utilization fit operation 520 of FIG. 5. The logical operations begin at filter operation 700 where the address blocks of the network are filtered to include only blocks that are free and are of the requested size or larger. Then, at range operation 710, if an address range has been specified for the allocation request, then only those blocks that are free and of at least the requested size that are within the specified range are kept.

Once the set of blocks for the network have been filtered to eliminate those that are not free, are not of sufficient size, and/or are not within the specified range, then an attempt is made to choose a smallest block from the set of remaining blocks, if any, at select operation 720. Selecting the smallest block preserves larger blocks for future allocation needs. The smallest block that is chosen is the highest or lowest numbered address of the remaining blocks of the same smallest size in accordance with the network allocation order specified for the network in the definitional listing. Once an attempt to select a smallest block is made, then query operation 630 detects whether a block remained in the set such that it was able to be selected. If not, then a fail is returned by the utilization fit operation 520. If a block was selected, then the block is returned from the utilization fit operation 520 at block operation 740.

Figure 8:
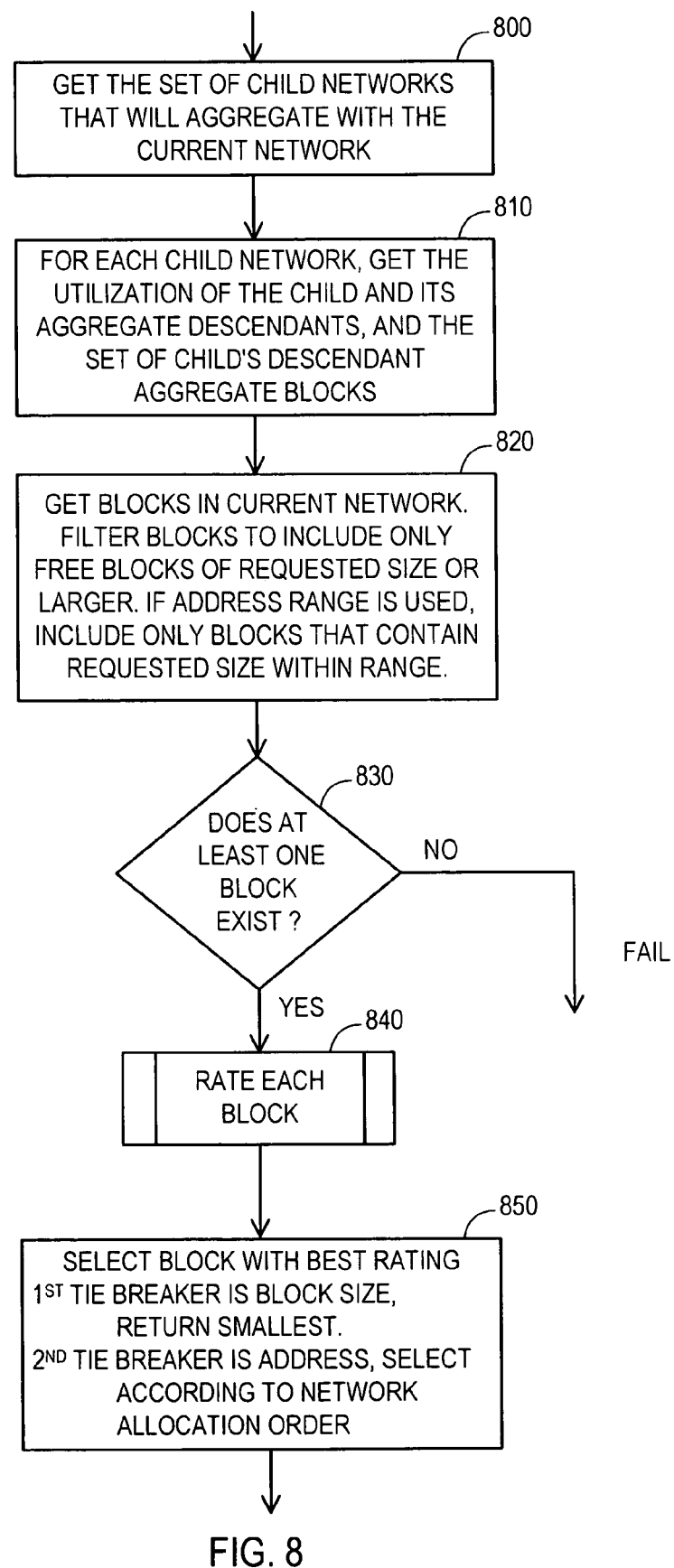
FIG. 8 shows an operational flow of an embodiment for selecting a block to allocate using a rated fit option as used in the operational flow of FIG. 3 when attempting to allocate the networking address space.

FIG. 8 shows the logical operations of the rated fit allocation type as utilized in rated fit operation 530 of FIG. 5. Initially, the current aggregation environment is determined for the current network by set operation 800 and utilization operation 810. The logical operations begin at set operation 800 where the set of child networks of the current network that will aggregate with the current network are obtained from the definitional listing. This is done by looking up the ID of the current network in the parent network category of each of the networks and also referencing the aggregation category and address type of each child network to see if it aggregates with the current network.

For each child network that is obtained, the utilization of it and the aggregate descendants of it (i.e., its children and descendents that aggregate with it) is found at utilization operation 810, discussed in more detail below with reference to FIG. 2A. Also, the set of descendant aggregate blocks for it are obtained, that set being the aggregate of all blocks belonging to all descendent networks that will aggregate with the current network, regardless of block status. The aggregate blocks and descendant aggregate blocks are shown in FIG. 2A. Non-aggregate descendants are not analyzed because they are considered to have a distinct instance of address space and they are not candidates for future address transfers. Then, at filter operation 820, the address blocks of the current network are filtered to include only blocks that are free and are of the requested size or larger. Also, if an address range has been specified for the allocation request, then only those blocks that are free and of at least the requested size that are within the specified range are kept.

Once the address blocks of the current network have been filtered, query operation 830 detects whether at least one block of the current network exists that meets the filtering criteria. If not, the rated fit operation 530 returns a fail. If so, then each block for the current network that passed through the filtering is rated at rate operation 840 according to the aggregation environment that is defined by the information collected in the previous operations. The details of the rate operation are discussed below with reference to FIG. 9. Upon rating each block, a block with the highest ranking is selected at select operation 850 and is returned as the selected block. Where multiple blocks tie for the highest ranking (i.e., lowest numerical rating), then the winning block is selected based on which has the smallest block size. If the multiple blocks tying for the highest rating also have the same size, then the block that is highest or lowest, depending on the network allocation order, is selected.

Figure 9:
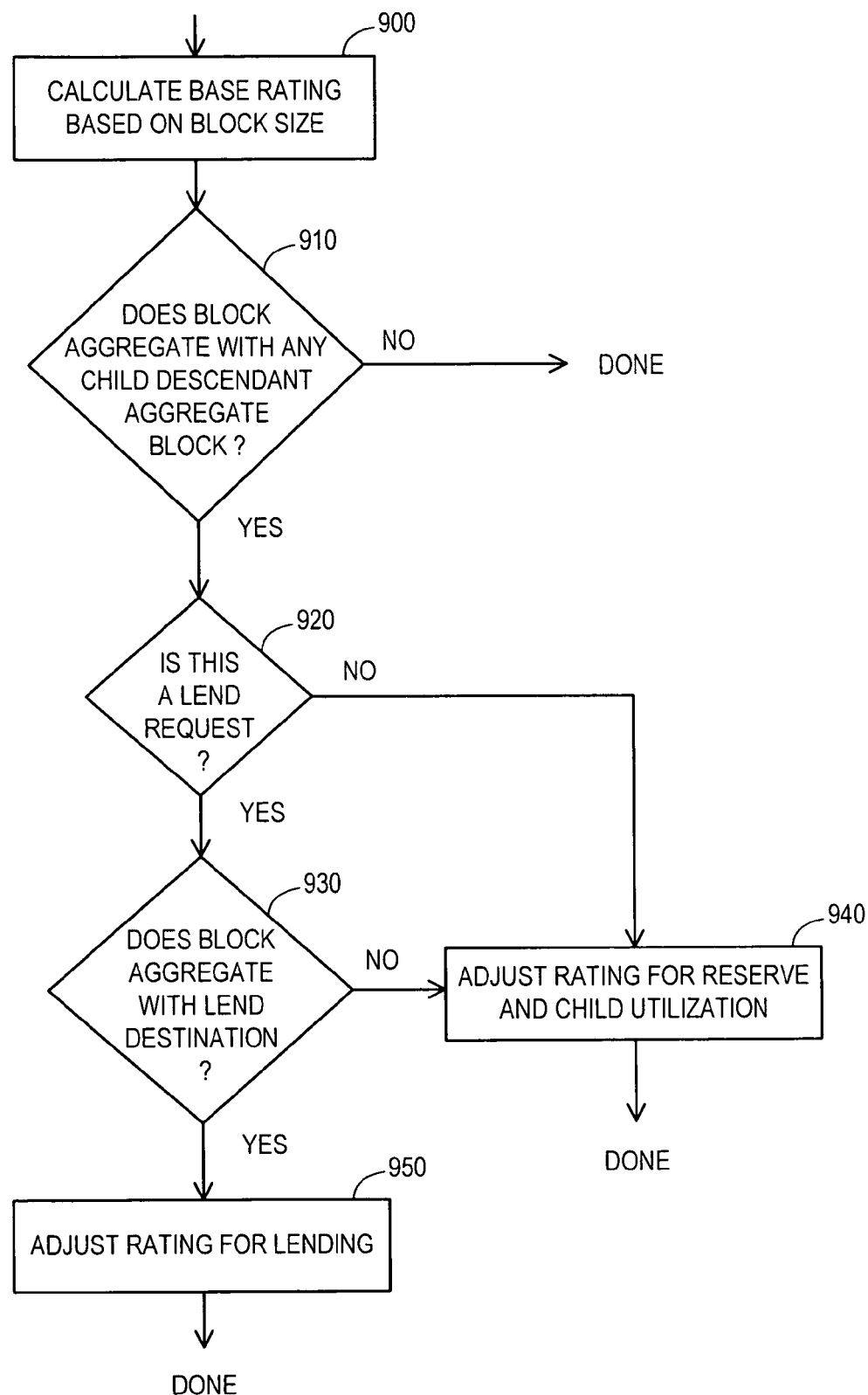
FIG. 9 shows an operational flow of an embodiment for rating a block when attempting to allocate using the rated fit option as used in the operational flow of FIG. 8.

FIG. 9 shows the logical operations for rating a block. A block rating is a weighted composite of various measurements of block characteristics. The rating process may be tuned by adjusting the weights, and these weights may be adjusted by parameter inputs. The logical operations begin at base rating operation 900 where the base rating for the block is calculated based on block size. This insures that the rated fit may be made to optimize for utilization among blocks that have no additional ratable characteristics (no aggregation or other tested qualities). The base rating may include a standard weight that determines the importance of block size against other characteristics.

After calculating the base rating for a block, query operation 910 detects whether the block aggregates with any child descendant aggregate block. If not, then the rating process is done and the rating given to the block is based solely on block size. If the block does aggregate with any child descendant aggregate block, then query operation 920 detects whether this current allocation request is a lend request such as performed at lend operation 320. If not, then the rating for the block is adjusted for reserve and child utilization at adjustment operation 940 and the rating process ends. This adjustment to the rating effectively reserves the block for future allocations to those descendant networks. The adjustment for child reservation is calculated by weighting the block size and adding a standard weight. The composite of two factors allows adjustment to be based on or independent of the block size. The tendency to reserve blocks is tuned by weighting the amount the ratings are adjusted for these blocks. The rating may be further adjusted by a weighted measure of the utilization of the aggregate network and its descendants. The utilization adjustment also includes a weighting factor that is multiplied by the block size and the aggregate child utilization, plus a standard amount multiplied by the aggregate child utilization. The two weights allow the adjustment for utilization to be affected by or independent of block size. Multiplying the adjustment by utilization also has the effect of more strongly reserving blocks that will aggregate with children that are more fully utilized.

For blocks where query operation 920 detects that this is a lend request, then query operation 920 detects whether the block aggregates with the lend destination (i.e. the network that receives the block of the lend). If not, then operational flow proceeds to adjustment operation 940. If so, then operational flow proceeds to adjustment operation 950 which adjusts, based on weighting, the rating for the block that will aggregate with the child network that will receive the block through lending, and then the rating ends. The rating adjustment for lending includes a component based on block size and a component of standard weight, allowing the adjustment to be based on or independent of block size. The rating resulting from such adjustment favors such a block to improve aggregation in the network.

As an example using the network configuration and address data in FIG. 2, allocate a range in the "Manufacturing" network with a block size of /28 (16 addresses). Table 1 below defines the fit parameters that will be used to rate and select a block in this example. FIG. 2A shows the aggregate block lists and utilizations that are calculated in utilization operation 810 in the rating process. The utilization percentages are calculated as the sum of the sizes of non-free blocks in the network and its aggregate descendants divided by the sum of the sizes of all of the blocks in the network and its aggregate descendants as shown in FIG. 2A (last column).

There is no address space available in the "Manufacturing" network, so a lend request is made to the parent network "Acme." Block selection from "Acme" is restricted by lending limits 210(/28) and 220(/26) of "Acme," making blocks 230 192.168.120.144/28) and 240 (192.168.120.208/28) the only blocks available to satisfy the lend request.

The block factor (BF) is a measurement of the block size expressed as the number of host bits. Candidate block 230 is a /28 block so the block factor is (address size−mask)=(32 bits−28)=4. The base rating for the block is (block size factor *block factor)=6*4=24. In query operation 910, it is determined that the block will aggregate with network "Accounting" and the process continues to query operation 920. This is a lend request so processing continues to query operation 930. "Accounting" is not the lend destination for the request, so processing continues to adjustment operation 940 where the rating is adjusted for reservation. The adjustment for reservation is [(BF*aggregate reserve factor ("ARF"))+aggregate reserve base ("ARB")]=[(4*−0.5625)+18]=15.75. The adjustment for child utilization is [(BF*aggregate utilization factor ("AUF")* Accounting utilization)+(aggregate utilization base ("AUB")*Accountingutilization)]=[(4*−0.169921875*0.50)+(5.4375* 0.50)]=−0.33984375+2.71875= 2.37890625. The total rating is the sum of the base and adjustments (24+15.75+ 2.37890625)=42.12890625.

Block 240 is the same size as block 230, so it has the same block factor of 4 and the same base rating, 24. It aggregates with Sales, which is not the lend destination, so the rating is adjusted for reservation and child utilization in adjustment operation 940. The reserve adjustment will be the same value as the previous block. However, the utilization for Sales and its descendants is 62.5%, so the child utilization adjustment is [(BF*AUF*Sales Utilization)+ (AUB*Sales Utilization)]=[(4*−0.169921875*0.625)+ (5.4375*0.625)]=−0.4248046875+3.3984375=2.9736328125. The total rating is (24+15.75+=2.9736328125= 42.7236328125.

The block with the lowest rated value is the preferred block. 192.168.120.144/28 is selected. The block is not larger than the adjusted allocation request, so the entire block is transferred to the child network "Manufacturing."

If the lend request for a /28 came from Accounting, the rating of block 230 would change. Query operation 930 would detect that the block aggregates with the lend destination and the rating would be adjusted by adjustment operation 950. The lending adjustment would be [(BF*aggregate lend factor ("ALF"))+aggregate lend base ("ALB")]=[(4 *0.4)+−12.8]=(1.6−12.8)=−11.2. The composite value is the base rating plus the lend adjustment=24+−11.2=12.8. Block 240 would not change its rating(42.7236328125) and block 230 would be chosen.

If the allocation request for a /28 came from Sales, block 230 would have the original value (42.12890625) and block 240 would be adjusted for lending at adjustment operation 950 for a final rating of 12.8. In this case, block 240 would be chosen.

TABLE 1

IPv4 Rated Fit Parameters

| Name | Abbreviation | Value |
| --- | --- | --- |
| Block Size Factor | BSF | 6 |
| Aggregate Lend Factor | ALF | 0.4 |
| Aggregate Lend Base | ALB | −12.8 |
| Aggregate Reserve Factor | ARF | −0.5625 |
| Aggregate Reserve Base | ARB | 18 |
| Aggregate Utilization Factor | AUF | −0.169921875 |
| Aggregate Utilization Base | AUB | 5.4375 |

The rated fit parameter values can be changed to adjust the relative importance of block size, aggregation with children, child utilization, and lending when selecting a block. The adjustments are used to tune the performance of the selection process for a balance of address utilization and aggregation. A screenshot 3200 of FIG. 32 shows a rated fit parameter table 3202 that the user has selected for viewing. The user may manipulate one or more of the parameters for each type of network of this example by clicking on the edit control 3204 which allows the user to enter a new parameter value in the table where appropriate.

The rated fit factors may be implemented as adjustable parameters to allow the user to control and tune the behavior of rated fit allocations. A factor wizard may be provided to assist the user in determining appropriate values for the factors to produce a predictable behavior. The user answers a series of questions regarding the choices that should be made in specific block comparisons. The factor values are computed from the user input. FIG. 32A shows a screenshot 3210 that provides one embodiment of a wizard for assisting the user in setting the rated fit parameter values.

Initially, the user selects in menu 3212 the address type of the network(s) that the rating operations will operate upon using the rated fit factors, and this value determines $bf_{max}$. The user specifies whether the difference in bits between a large block that will aggregate with a requesting child and a smaller block that will not aggregate with any child is constant throughout the entire range of block sizes at selection 3214. Then, at field 3216, the user specifies this difference in bits for the smallest blocks, which is $delta_{lend0}$ ("$\delta_{lend0}$"). At field 3218, if the user selected that the difference in bits is not constant at selection 3214, then the user specifies the difference in bits for the largest blocks, which is $delta_{lend1}$ ("$\delta_{lend1}$"). If the difference is constant, then the value is equal to $\delta_{lend0}$.

At selection 3220, the user specifies whether the difference in bits between a large non-aggregate block and a smaller block that would aggregate with a child is constant throughout the entire range of block sizes. Then, at field 3222, the user specifies this difference in bits for the smallest blocks, which is $delta_{res0}$ ("$\delta_{res0}$"). At field 3224, if the user selected that the difference in bits is not constant at selection 3220, then the user specifies the difference in bits for the largest blocks, which is $delta_{res1}$ ("$\delta_{res1}$"). If the difference is constant, then the value is equal to $\delta_{res0}$.

At selection 3226, the user specifies whether child utilization affects reservation of blocks of the parent. If the user selects that child utilization does affect reservation of the parent blocks, then at selection 3228, the user specifies whether this effect of child utilization is constant throughout the entire range of block sizes. The user specifies at field 3230 how much larger the difference in bits between a large non-aggregate block and a smaller block that would aggregate with a child is at 100% utilization for the smallest blocks, which is $delta_{util0}$ ("$\delta_{util0}$"). If child utilization has no effect, then $\delta_{util0}$ is equal to zero. Then, the user specifies at field 3232 how much larger the difference in bits between a large non-aggregate block and a smaller block that would aggregate with a child is at 100% utilization for the largest blocks, which is $delta_{util1}$ ("$\delta_{util1}$"). If the difference is constant across the entire address range, then $\delta_{util1}$ is equal to $\delta_{util0}$.

Upon receiving these inputs from the user through the wizard for FIG. 32A, then the factors of Table 1, listed as set 3234 of FIG. 32A may be computed. These putations follow as equations 1-6. In these equations, a block size factor ("BSF") is used. This value may be any positive real number. Changing this value scales all of the ratings but results in the same relative ratings. A value of 1 or $bf_{max}$ are reasonable values for BSF, but any value may be used. Using a negative value of BSF will cause the portion of the rating based on block size to favor larger blocks, therefore increasing fragmentation of the address space. A zero value of BSF results in all parameters being zero, which disables the rating system completely and resorts to block selection by size and then address order, thereby mimicking the utilization fit.

$$ALF = \frac{BSF(\delta_{lend0} - \delta_{lend1})}{bf_{max} - \delta_{lend0}} \qquad \text{equation (1)}$$

$$ALB = -(ALF + BSF) \cdot \delta_{lend0} \qquad \text{equation (2)}$$

$$ARB = BSF \cdot \delta_{res0} \qquad \text{equation (3)}$$

-continued $$ARF = \frac{BSF \cdot \delta_{res1} - ARB}{bf_{max} - \delta_{res1}} \qquad \text{equation (4)}$$

$$AUB = (BSF + ARF) \cdot \delta_{util0} \qquad \text{equation (5)}$$

$$AUF = \frac{(BSF + ARF) \cdot \delta_{util} - AUB}{bf_{max} - \delta_{util1}} \qquad \text{equation (6)}$$

Screenshot 3210 also includes a chart of blocks with varying mask sizes 3236 and resulting ratings 3238 for each block size with variation in aggregation and child utilization. Accordingly, a user can verify the ratings that result from the answers the user has provided to the wizard and that will be applied during rated fit selection of blocks.

Figure 23:
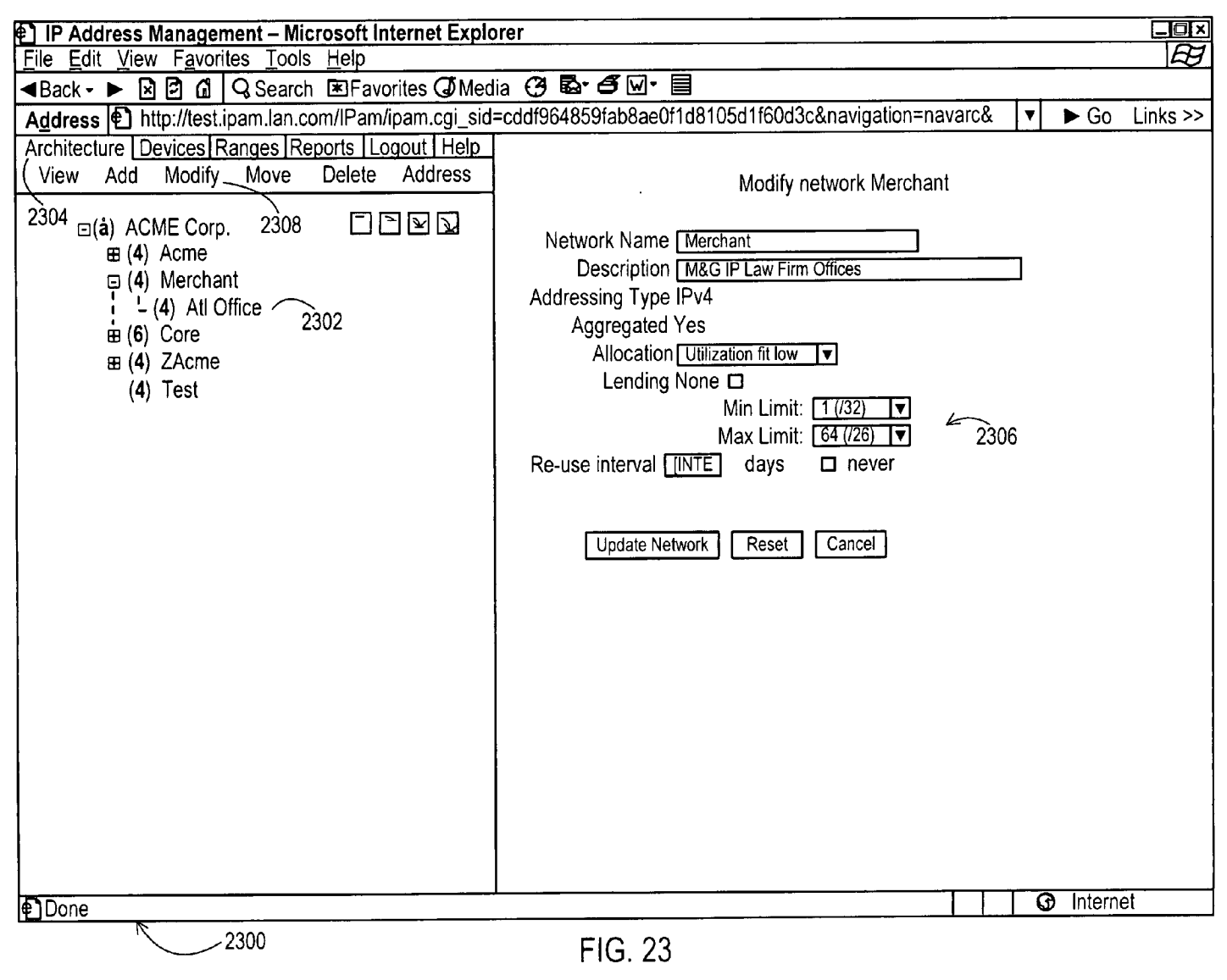

FIG. 23 provides a screenshot 2300 that shows the network settings for a network 2302 being adjusted by selecting the architecture button 2304 and then the modify button 2308. The result is that a page 2306 of user input fields are displayed to allow the user to configure the parameters of the network. As shown in screenshot 2400 of FIG. 24, the user may select the allocation type drop down menu 2402 to modify the allocation type and order of the current network. As shown in screenshot 2500 of FIG. 25, checkbox 2504 allows the user to select whether the network will allow lending. If lending is allowed, the user may select the lending minimum drop down menu 2502 to select the minimum size block that the network will lend. As shown in screenshot 2600 of FIG. 26, the user may select the lending maximum drop down menu 2602 to select the maximum size block the network will lend. A logical extension is to configure the lending limits of aggregate networks so that descendant networks lend smaller blocks than ancestors.

Figure 27:
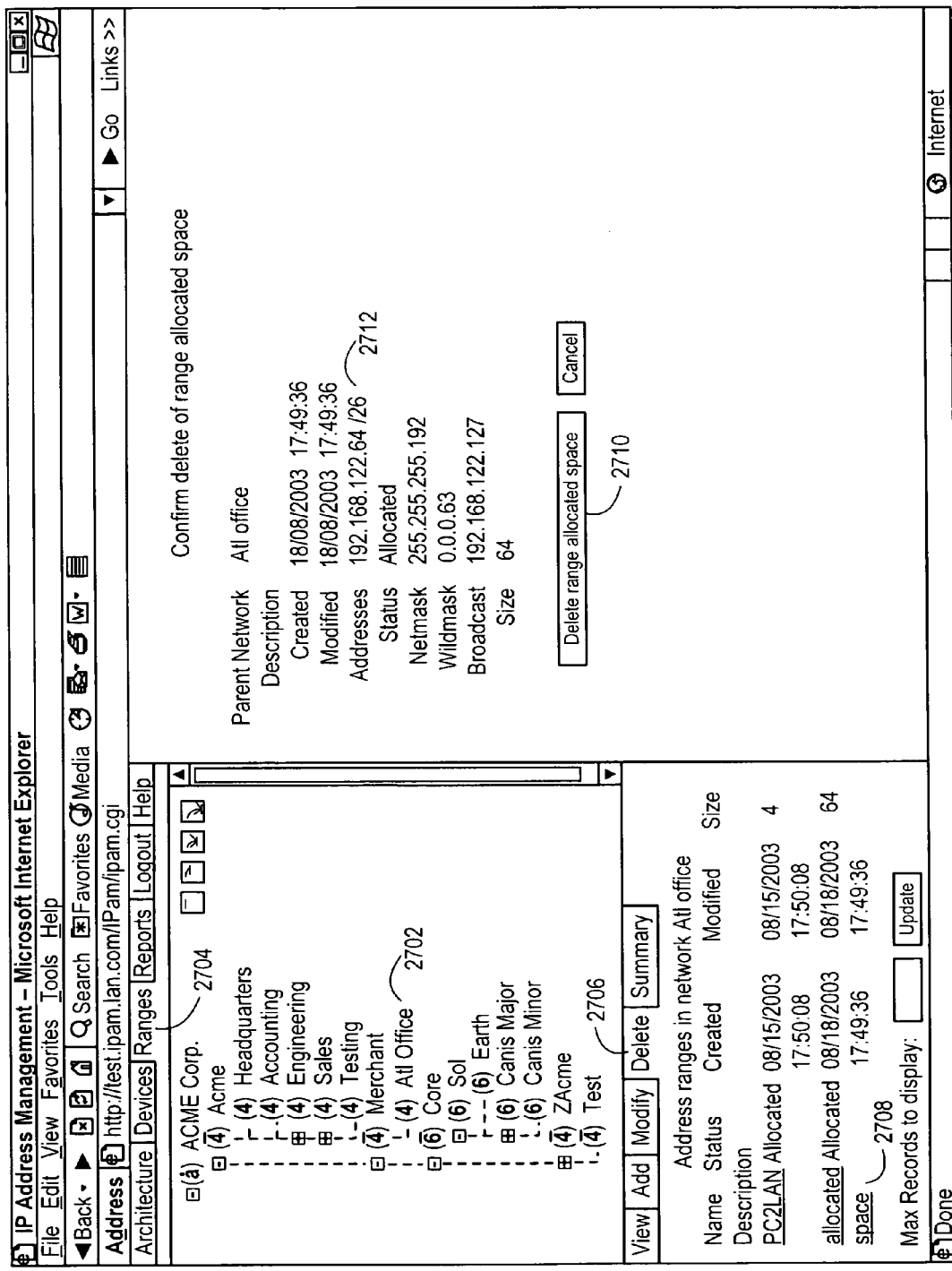
FIG. 27 shows a screenshot where a user is deleting an address range to deallocate the range.
Figure 28:
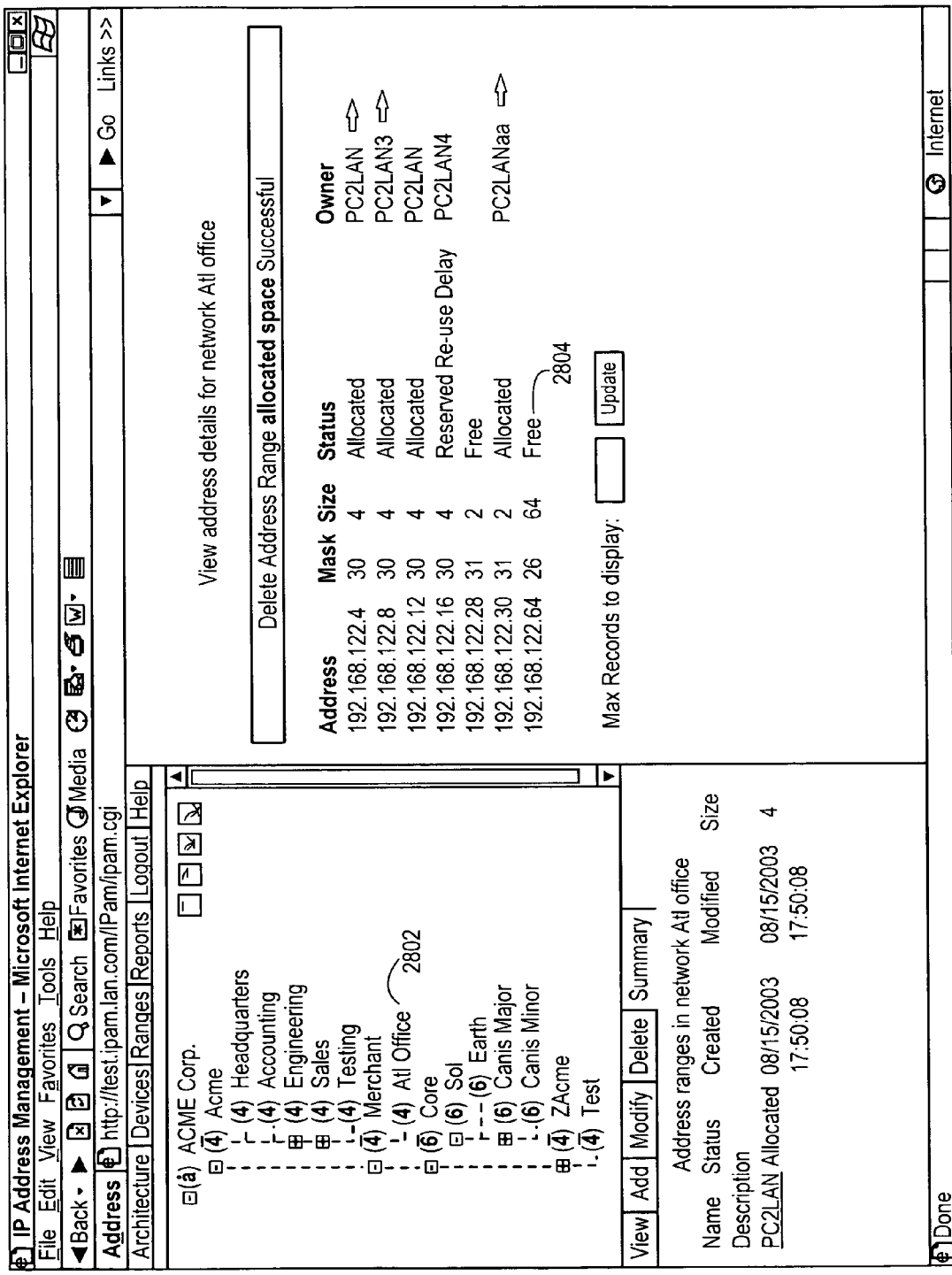
FIG. 28 shows a screenshot where the deallocated address block is shown with a free status.
Figure 29:
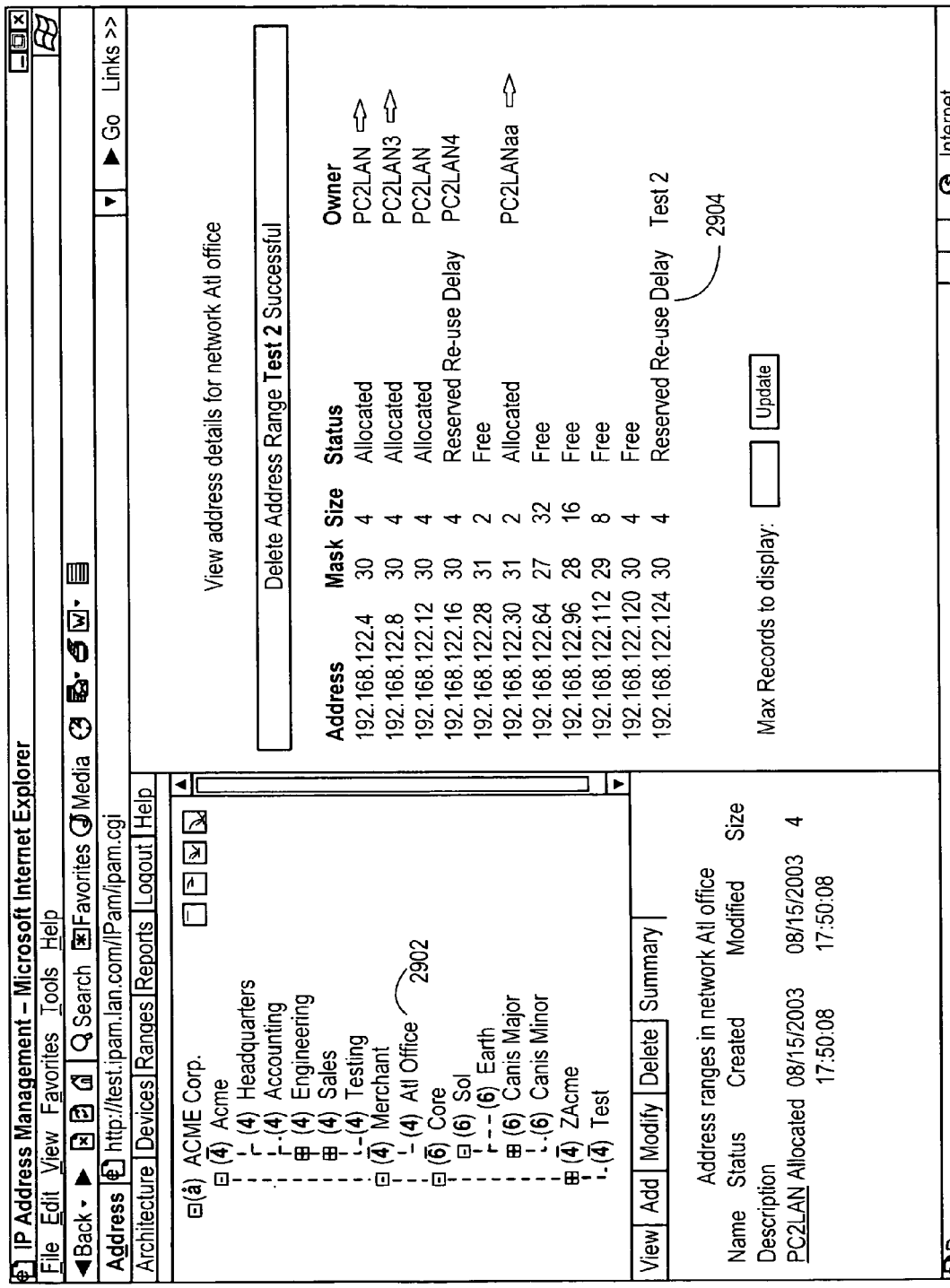
FIG. 29 shows a screenshot where the address block being deallocated currently is given a re-use delay interval status.

After completing a request for allocating a block of networking address space, a user may choose to deallocate a previously allocated block. For example, the user may delete all devices from the connection that a block has been allocated for such that the block can be deallocated and returned to the free status. Also, the user may explicitly choose to delete an allocated address range that has no devices assigned to it. The screenshot 2700 of FIG. 27 shows an instance where a user has chosen a network 2702 and has selected a ranges button 2704 to gain access to the address ranges for the network. Additionally, the user has selected a range 2708 of address space and has selected the delete button 2706. This has resulted in a page being displayed that provides the addresses 2712 of the range and a button 2710 to complete the deletion of the range. Deleting the range serves to return the range to a free status from its present allocated status.

Figure 10:
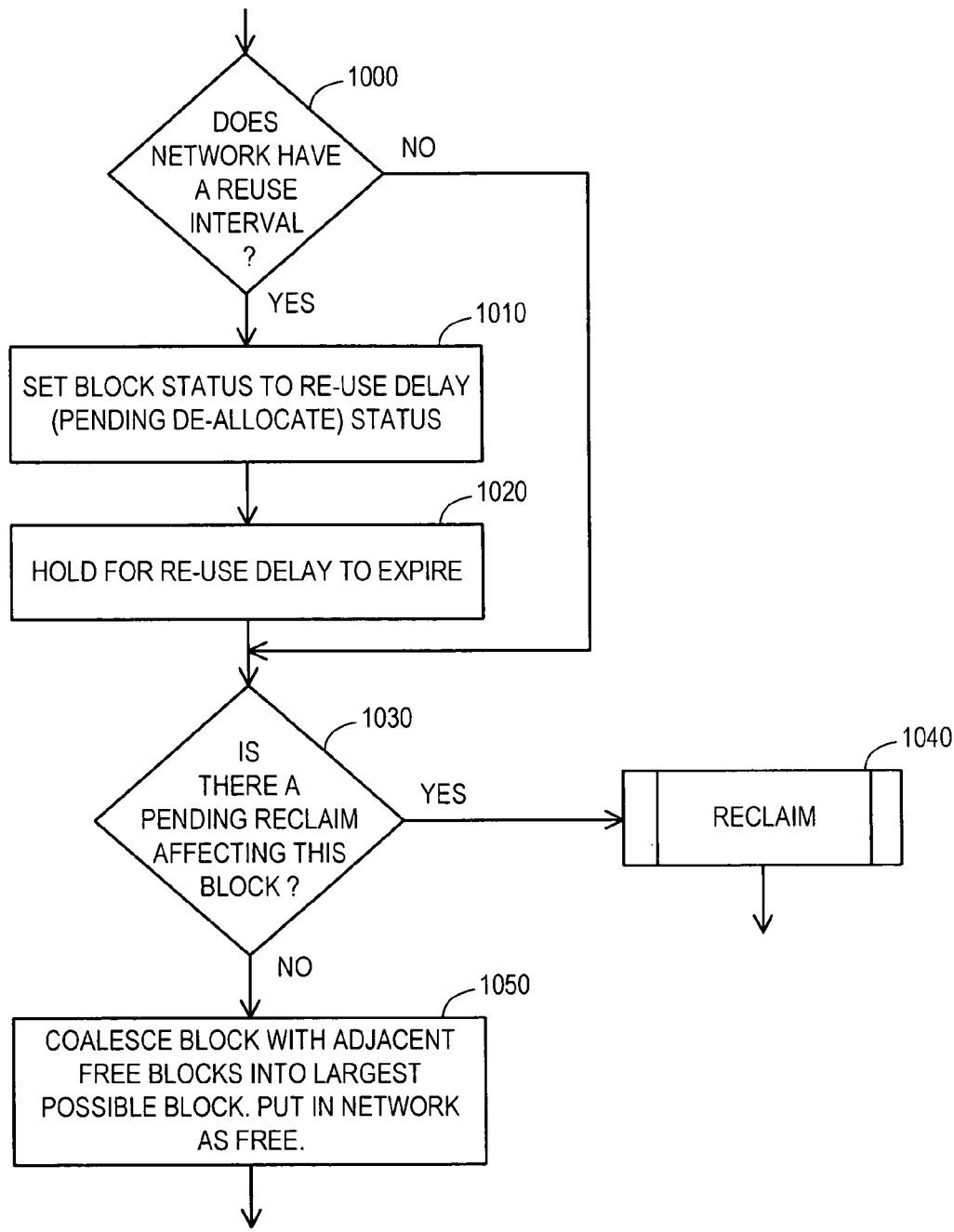
FIG. 10 shows an operational flow of an embodiment for deallocating networking address space to a free status.

Upon selecting the button 2710 to complete the deallocation or upon another deallocation trigger, the logical operations of FIG. 10 for deallocating the block begin. Initially, query operation 1000 detects whether the network has a re-use interval by referencing the re-use interval category for the network within the definitional listing. If not then operational flow proceeds to query operation 1030. If so, then status operation 1010 sets the block status to re-use delay which indicates that the block is in a pending deallocation status. Then at delay operation 1020, the deallocation is delayed until the expiration of the re-use interval. The re-use interval may range from no delay to never allowing re-use. If never allowing re-use, then operational flow ends at delay operation 1020 by leaving the block in the re-use delay status. Those skilled in the art will recognize there are many methods and time units for implementing the delay timer.

Once the delay operation 1020 reaches the expiration of the re-use interval, the operational flow proceeds to query operation 1030 where it is detected whether a reclaim is pending that affects the block being deallocated. It is known that a pending reclaim affects the block being deallocated because the block being deallocated is identified as having a pending reclaim in addition to the allocated status by a reclaim process that has been initiated. If that is the case, then operational flow proceeds to reclaim operation 1040, entering at split operation 1140. The details of the reclaim operation 1040, including split operation 1140, are described in more detail below with reference to FIG. 11. If there is no pending reclaim affecting the block currently being deallocated, then operational flow proceeds to coalesce operation 1050 where the deallocated block is coalesced with adjacent free blocks to form the largest possible free block.

The coalesce operation 1050 is repetitive in that the adjacent block to the deallocated block coalesces with the deallocated block to form a larger block, and then the adjacent block to the larger block coalesces with the larger block to form an even larger block. This carries on until there are no more adjacent free blocks. By coalescing the blocks, it is insured that at any restful state, the free space present in the network is represented as the minimum number of and largest possible blocks. The resulting block is returned to the network as free.

Upon successfully deallocating a block, such as after pressing the button 2710 of FIG. 27 and after expiration of any re-use interval, a visual indication of the deallocated block may be provided. An example is shown in the screenshot 2800 of FIG. 28 for a network 2802 where the summary of the address ranges are displayed. The deallocated address block is indicated as having a free status 2804. In this example, no adjacent blocks were free to coalesce with the deallocated block such that the deallocated block has retained its size but has the free status. Had the deallocated block coalesced with adjacent blocks, then the visual indicator may have displayed the larger block after the coalescing completed as having the free status. As shown in the screenshot 2900 of FIG. 29, if a re-use interval for the block being deallocated for a network 2902 has not yet expired, then the summary of the address ranges displays the address block as having a re-use interval delay status 2904.

A reclaim may be initiated for a block of addresses to collect address blocks for future disposition. A reclaim reserves free and deallocated blocks until the larger requested block is available. Reservation prevents allocation, movement, or removal of any block while a pending reclaim covers that block. Reclaim facilitates renumbering, which is necessary when merging two networks with conflicting space, returning an address block to a service provider or registry, or for network reorganization. Reclaim may also be used to restore address blocks that have been moved by other processes such as lending. Reclaim actions include setting to free, deleting, moving to another network, or allocating.

Figure 30:
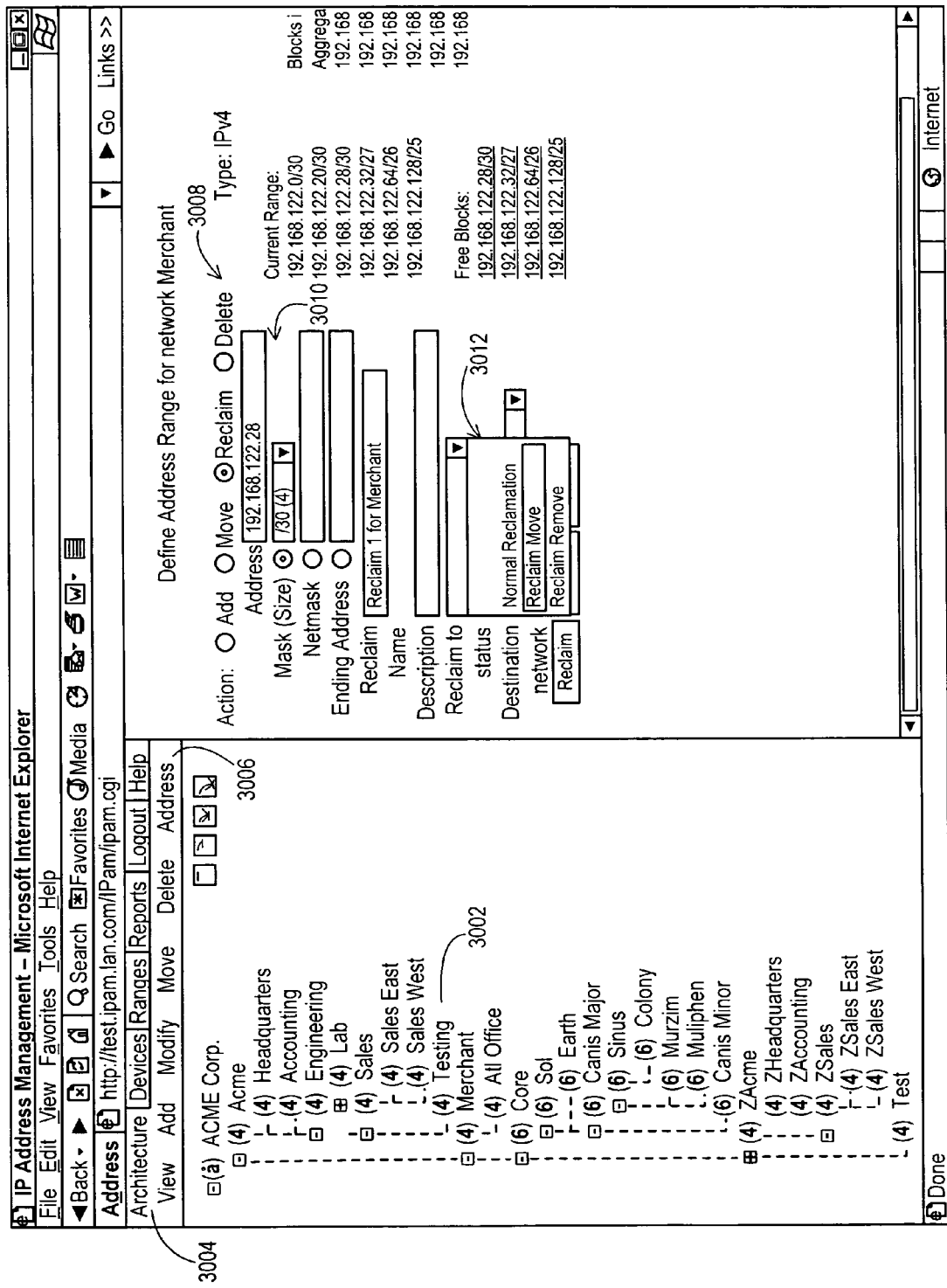
FIG. 30 shows a screenshot where a user is initiating a reclaim action.
Figure 31:
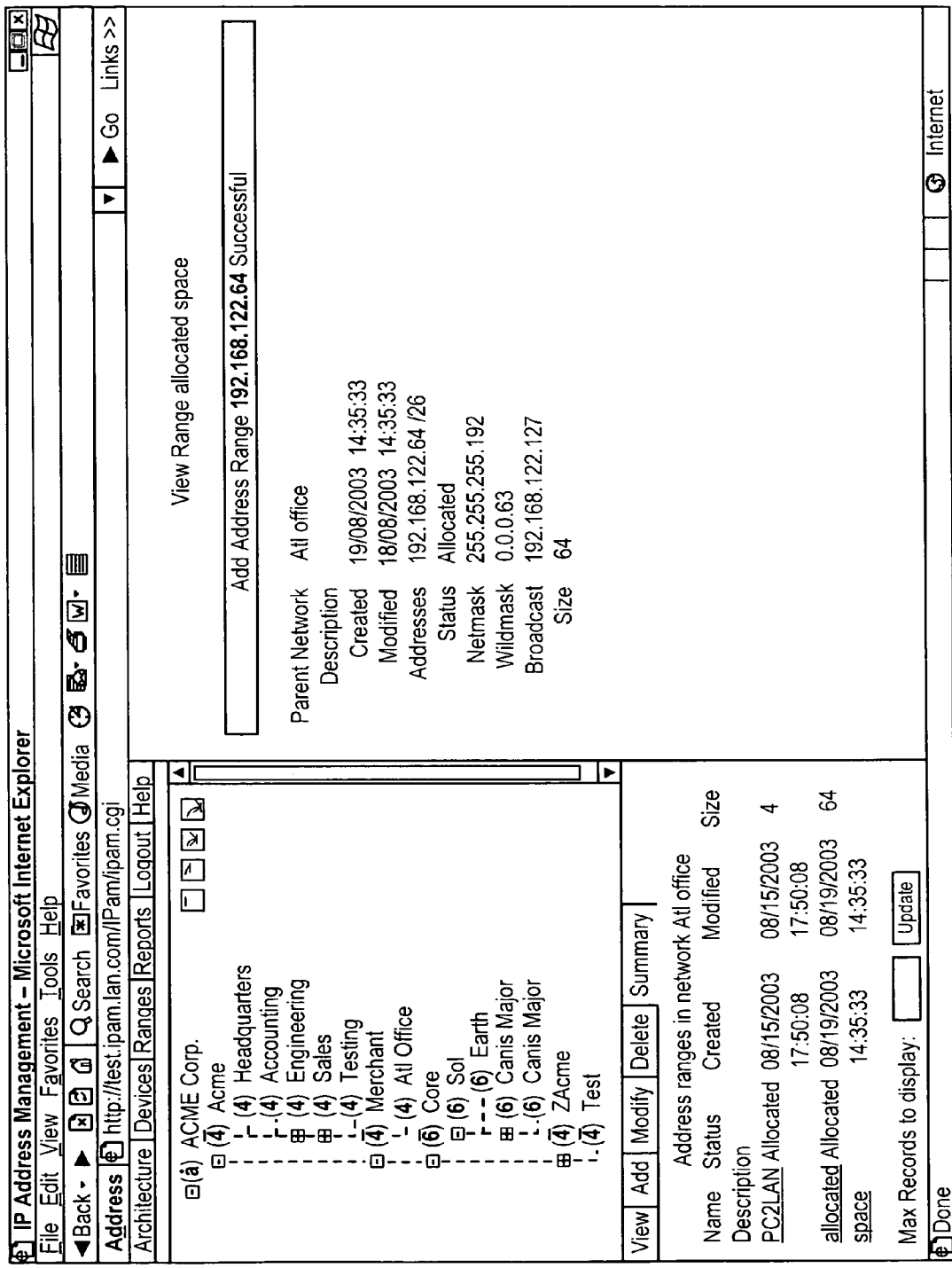
FIG. 31 shows a screenshot where a user has successfully requested that an address range be added to allocate the space.

As one example of initiating a reclaim, a user may select that a reclaim be performed as shown in the screenshot 3000 of FIG. 30. In this example, the user has selected a network 3002 and then the architecture button 3004. Additionally, the user has selected the address selection 3006 to access a page providing options for manipulating the address space for a network. In this case, the user has selected a reclaim option 3008 and has provided a start address and mask size 3010 defining a block to reclaim. The user could have specified the block in other ways as well such as using a netmask or an ending address.

The user then selects the particular type of reclaim to perform from a reclaim drop down menu 3012, such as a normal reclamation, a reclaim move, or a reclaim remove. Upon completion of the reclaim block, a normal reclamation returns the block to the current network as free, while a reclaim move reclaims the address block for the network and moves it to a destination network specified by the user, and while a reclaim remove reclaims the address block and then removes it from the network space altogether leaving the block undefined.

Figure 11:
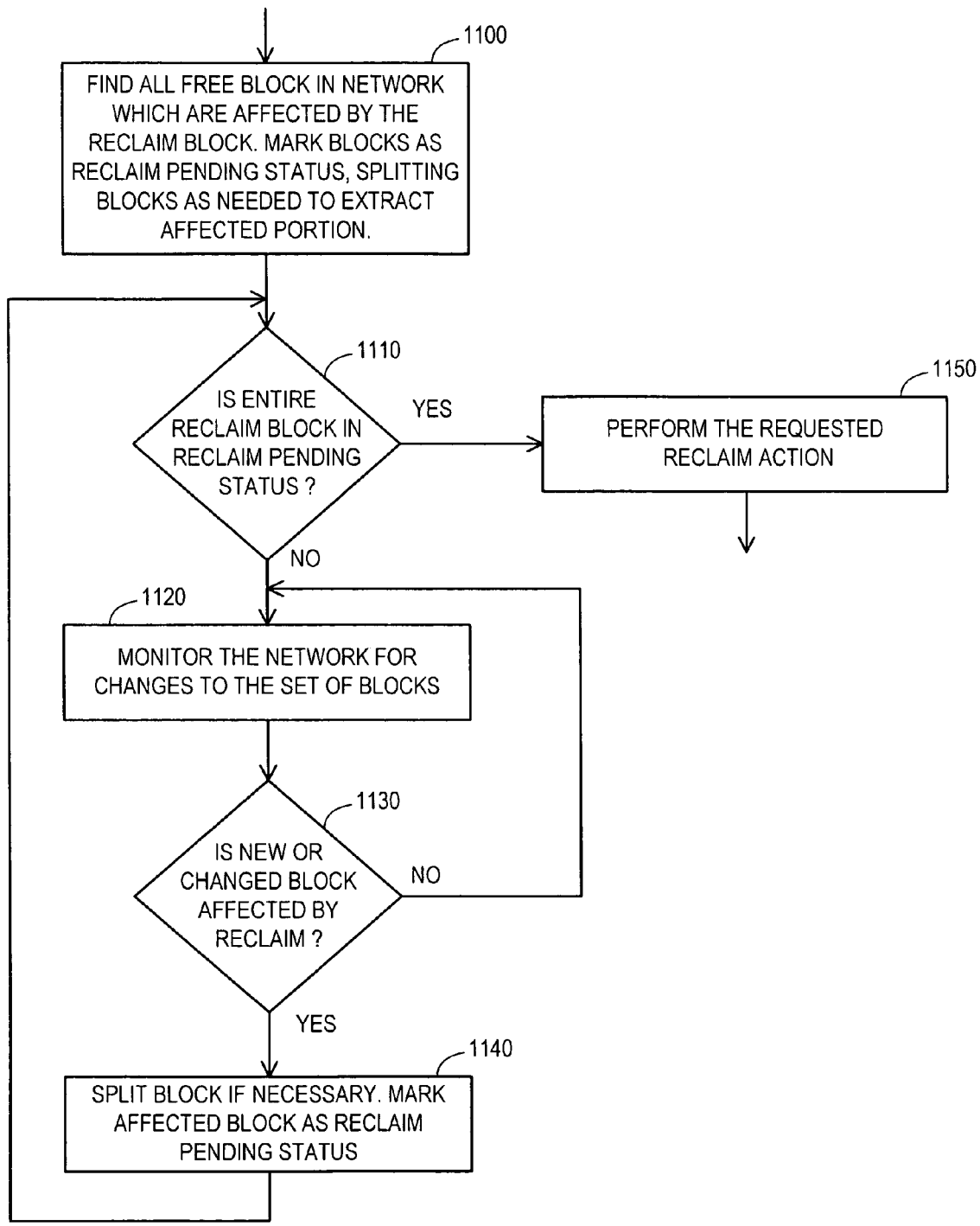
FIG. 11 shows an operational flow of an embodiment for reclaiming networking address space according to a requested reclaiming action.

Upon the user selecting the reclaim option, the logical operations of FIG. 11 begin. Initially, all free blocks in the current network that are affected by the reclaim block are found at block operation 1100. The reclaim block may be larger than the individual blocks defined for the current network where the individual blocks are not all free such that they have not coalesced into a larger block the size of the reclaim block. These blocks are marked with the reclaim pending status, which prevents their use by any other process while the reclaim is in progress. Also, the reclaim block may fit within a larger defined block for the network such that the larger block must be split in half one or more times to reveal the reclaim block. The portion of the block that has been split that is not affected by the reclaim is returned to the network as free.

Query operation 1110 detects whether the entire reclaim block is in reclaim pending status. If so, then the requested reclaim action, such as setting to free, deleting, moving to another network, or allocating is performed at action operation 1150. If the entire reclaim block is not in reclaim pending status because some portion of the reclaim block remains in another status other than free, then operational flow proceeds to monitor operation 1120. Here, the status of the current network is monitored for trigger events that cause operational flow to proceed to query operation 1130. These events include the definition of new blocks, the deallocation of blocks, the completion of a separate reclaim action, or any other activity that results in new free blocks in the network.

Upon one of these triggering events being detected, query operation 1130 detects whether the new or changed block is affected by the pending reclaim. If not, then operational flow returns to monitor operation 1120. If so, then operational flow proceeds to split operation 1140 where the new or changed block is split in half as many times as necessary to reveal the block of the new or changed block that is affected by the pending reclaim. The block(s) of the new or changed block not affected by the reclaim remains as free while the block that is affected by the pending reclaim is marked with the reclaim pending status. Operational flow then returns to query operation 1110.

While the embodiments above are discussed in relation to IPv4 networking addressing, it will be appreciated that the discussion in relation to IPv4 is for purposes of illustration only and that these embodiments may be used in conjunction with networks using ASN, IPv6, or other networking addressing schemes. Furthermore, the logical operations for receiving user input and controlling the status of networking address space has been discussed in the context of CIDR format IP address space for purposes of illustration only. Therefore, it will be appreciated that embodiments of the present invention are operable in the context of other networking address types as well, such as but not limited to telephone numbers, MAC values, serial numbers, and others.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of changing a status of a portion of network address space from free to another status, comprising:
    receiving a request of a block size to allocate for a current network with a new status, the request identifying a specified range to allocate from;
    detecting within a definitional listing for the network address space, a block with free status of sufficient size to cover the block size to allocate;
    assigning, for the current network, the new status to the detected block within the definitional listing;
    detecting whether a block of the requested size exists within the network address space assigned to the current network;
    lending a block from a second network that aggregates with the current network when a block of the requested size does not exist within the network address space assigned to the current network; and
    returning a fail indication and not lending a block from a second network that aggregates with the current network when a block of the requested size does not exist within the specified range but does exist within the current network, and
    wherein lending a block from a second network comprises
    detecting whether a block of at least the requested size exists within a specified range of the network address space assigned to the second network,
    when a block of at least the requested size exists within a specified range of the network address space assigned to the second network, splitting the block until it is the requested size and moving a resulting block from the second network to the current network as represented within the definitional listing, and
    when a block of the requested size does not exist within the specified range, lending a block from a third network that aggregates with the second network.

2. The computer-implemented method of claim 1, wherein when lending a block from the second network includes receiving a rated fit selection, the method further comprises:
    rating each block of the second network of at least the requested size according to a block size and whether there is aggregation with child descendant aggregate blocks of a requesting or other child network; and
    selecting a block with the best rating.

3. A computer storage media having computer-executable instructions stored thereon for changing a status of a portion of network address space from free to another status which, when executed by a computer, cause the computer to:
    receive a request of a block size to allocate for a current network with a new status, the request identifying a specified range to allocate from;
    detect within a definitional listing for the network address space, a block with free status of sufficient size to cover the block size to allocate;
    assign, for the current network, the new status to the detected block within the definitional listing;
    detect whether a block of the requested size exists within the network address space assigned to the current network;
    lend a block from a second network that aggregates with the current network when a block of the requested size does not exist within the network address space assigned to the current network; and
    return a fail indication and not lend a block from a second network that aggregates with the current network when a block of the requested size does not exist within the specified range but does exist within the current network, and wherein lending a block from a second network comprises detecting whether a block of at least the requested size exists within a specified range of the network address space assigned to the second network, when a block of at least the requested size exists within a specified range of the network address space assigned to the second network, splitting the block until it is the requested size and moving a resulting block from the second network to the current network as represented within the definitional listing, and when a block of the requested size does not exist within the specified range, lending a block from a third network that aggregates with the second network.

4. The computer storage media of claim 3, having further computer-executable instructions stored thereon which, when executed by the computer, will cause the computer to:
    determine whether lending a block from the second network includes receiving a rated fit selection; and
    in response to determining that lending a block from the second network does include receiving a rated fit selection, to rate each block of the second network of at least the requested size according to a block size and whether there is aggregation with child descendant aggregate blocks of a requesting or other child network and to select a block with the best rating.

* * * * *